United States Patent
Finke

(10) Patent No.: US 11,180,860 B2
(45) Date of Patent: Nov. 23, 2021

(54) PROCESS TO CONVERT REDUCED SULFUR SPECIES AND WATER INTO HYDROGEN AND SULFURIC ACID

(71) Applicant: California Institute of Technology, Pasadena, CA (US)

(72) Inventor: Cody E. Finke, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 52 days.

(21) Appl. No.: 16/415,275

(22) Filed: May 17, 2019

(65) Prior Publication Data

US 2019/0376191 A1   Dec. 12, 2019

Related U.S. Application Data

(60) Provisional application No. 62/673,707, filed on May 18, 2018, provisional application No. 62/726,858,
(Continued)

(51) Int. Cl.
*H01M 8/06* (2016.01)
*C25B 1/22* (2006.01)
(Continued)

(52) U.S. Cl.
CPC .............. *C25B 1/22* (2013.01); *B09C 1/08* (2013.01); *C02F 1/66* (2013.01); *C04B 2/10* (2013.01);
(Continued)

(58) Field of Classification Search
CPC ............. H01M 8/0656; H01M 8/0606; H01M 8/0662; C25B 1/22; C25B 1/02;
(Continued)

(56) References Cited

U.S. PATENT DOCUMENTS 2,863,726 A   12/1958 Jonas
4,069,063 A   1/1978 Ball
(Continued)

FOREIGN PATENT DOCUMENTS

CA   1327694   3/1994
CA   2240067   6/1997
(Continued)

OTHER PUBLICATIONS

Dergacheva et al. (2009) "Basalt Leaching with Orthophosphoric Acid," Inorganic Materials (45)12: 1366-1369.
(Continued)

*Primary Examiner* — Raymond Alejandro
(74) *Attorney, Agent, or Firm* — Leydig, Voit & Mayer, Ltd.

(57) ABSTRACT

In an aspect, provided herein are methods for producing sulfuric acid and hydrogen gas, the methods comprising steps of: providing sulfur dioxide formed by thermal conversion of a sulfur-containing species; electrochemically oxidizing said sulfur dioxide to sulfuric acid in the presence of water; and electrochemically forming hydrogen gas via a reduction reaction. In some embodiments, the methods comprise a step of thermally converting said sulfur-containing species to said sulfur dioxide. Systems configured to perform these methods are also disclosed herein. Also provided herein are methods and systems for producing sulfuric acid and hydrogen gas by electrochemically forming the sulfuric acid and the hydrogen gas in a mixture comprising a sulfur material, a supporting acid, and water. Also provided herein are methods and systems for producing a cement material.

13 Claims, 21 Drawing Sheets

Related U.S. Application Data filed on Sep. 4, 2018, provisional application No. 62/743,652, filed on Oct. 10, 2018, provisional application No. 62/794,486, filed on Jan. 18, 2019, provisional application No. 62/831,372, filed on Apr. 9, 2019.

(51) Int. Cl.

| | |
|---|---|
| H01M 8/0656 | (2016.01) |
| C25B 1/02 | (2006.01) |
| B09C 1/08 | (2006.01) |
| C09K 17/02 | (2006.01) |
| C05B 11/08 | (2006.01) |
| C04B 2/10 | (2006.01) |
| C02F 1/66 | (2006.01) |
| C25B 9/17 | (2021.01) |

(52) U.S. Cl.
CPC ............ *C05B 11/08* (2013.01); *C09K 17/02* (2013.01); *C25B 1/02* (2013.01); *C25B 9/17* (2021.01); *H01M 8/0656* (2013.01)

(58) Field of Classification Search
CPC ..... C25B 9/17; B09C 1/08; C02F 1/66; C04B 2/10; C05B 11/08; C09K 17/02
See application file for complete search history.

(56) References Cited

U.S. PATENT DOCUMENTS

| | | | |
|---|---|---|---|
| 4,158,042 A | 6/1979 | Deutschman | |
| 4,487,784 A | 12/1984 | Kuroda et al. | |
| 4,966,757 A | 10/1990 | Lewis et al. | |
| 5,049,198 A | 9/1991 | Ribas | |
| 6,613,141 B2 | 9/2003 | Key, Jr. | |
| 7,261,874 B2* | 8/2007 | Lahoda | C01B 13/0203 423/648.1 |
| 7,749,476 B2 | 7/2010 | Constantz et al. | |
| 7,794,685 B2 | 9/2010 | Rauser et al. | |
| 8,043,594 B2 | 10/2011 | Lackner et al. | |
| 8,043,597 B2 | 10/2011 | Daum et al. | |
| 8,206,655 B2 | 6/2012 | Gong et al. | |
| 8,956,526 B2 | 2/2015 | Gorensek | |
| 9,057,136 B2 | 6/2015 | Weidner et al. | |
| 2006/0013761 A1 | 1/2006 | Lahoda et al. | |
| 2009/0000956 A1 | 1/2009 | Weidner et al. | |
| 2010/0313794 A1 | 12/2010 | Constantz et al. | |
| 2011/0290153 A1 | 12/2011 | Abdullah et al. | |
| 2012/0034154 A1* | 2/2012 | McHugh | C01G 15/00 423/539 |
| 2012/0067740 A1 | 3/2012 | Gasik et al. | |

FOREIGN PATENT DOCUMENTS

| | | |
|---|---|---|
| CN | 101671848 | 3/2010 |
| EP | 0004568 | 10/1979 |
| EP | 2468388 | 6/2012 |
| FI | 121271 | 9/2010 |
| JP | 2005-145785 | 6/2005 |
| KR | 10-2014-0000736 | 1/2014 |
| WO | WO 2017-077180 | 5/2017 |

OTHER PUBLICATIONS

Druecker et al. (2015) "Amended Preliminary Economic Assessment (PEA) for Specialty Alumina Production from The White Mountain Anorthosite Deposit, West Greenland," Hudson Resources Inc., 162 pages.
Ellis et al. (publicly available Sep. 2019) "Toward electrochemical synthesis of cement—An electrolyzer-based process for decarbonating $CaCO_3$ while producing useful gas streams," PNAS (Jun. 2020) 117(23): 12584-12591.
Garrick et al. (Dec. 2017) "Characterizing Voltage Losses in an $SO_2$ Depolarized Electrolyzer Using Sulfonated Polybenzimidazole Membranes," ECS 164(14): F1591-F1595.
Golden et al. (2005) "Laboratory-simulated acid-sulfate weathering of basaltic materials: Implications for formation of sulfates at Meridiani Planum and Gusev crater, Mars," JGR Planets 110, E12S07: 1-15.
Gong (2015) "Emulating Volcanism to Create a New Class of Recycled Water," Harmon Systems International, LLC & Earth Renaissance Technologies, LLC: 1 page (poster).
Gorensek (2011) "Hybrid sulfur cycle flowsheets for hydrogen production using high-temperature gas-cooled reactors," International Journal of Hydrogen Energy 36: 12725-12741.
Gou et al. (Jan. 2019) "Utilization of tailings in cement and concrete: A review," Sci Eng Compos Mater 26: 449-464.
Hausrath et al. (2013) "Acid sulfate alteration of fluorapatite, basaltic glass and olivine by hydrothermal vapors and fluids: Implications for fumarolic activity and secondary phosphate phases in sulfate-rich Paso Robles soil at Gusev Crater, Mars," JGR Planets 118(1): 1-13.
Horneck et al. (2007) "Acidifying Soil for Crop Production: Inland Pacific Northwest," A Pacific Northwest Extension publication: 1-15.
Lokkiluoto et al. (2010) "Study of $SO_2$-Depolarized Water Electrolysis," 18th World Hydrogen Energy Conference: 105-111.
Lokkiluoto et al. (2012) "Novel process concept for the production of $H_2$ and $H_2SO_4$ by $SO_2$-depolarized electrolysis," Environ Dev Sustain 14: 529-540.
Lokkiluoto (2013) "Fundamentals of $SO_2$ depolarized water electrolysis and challenges of materials used," Doctoral Dissertation, Aalto University: 144 pages.
Lu et al. (1981) "Recent developments in the technology of sulphur dioxide depolarized electrolysis," Journal of Applied Electrochemistry 11(3): 347-355.
mining.com Staff Writer (Feb. 2019) "Mine tailings could be used to produce cement replacement material," available online at https://www.mining.com/mine-tailings-used-produce-cement-replacement-material/, 2 pages.
NEMO Project Abstract "Near-zero-waste recycling of low-grade sulphidic mining waste for critical-metal, mineral and construction raw-material production in a circular economy" and "General Presentation" (Apr. 2020): 34 pages.
Padeste et al. (1990) "The influence of transition metals on the thermal decomposition of calcium carbonate in hydrogen," Materials Research Bulletin 25(10): 1299-1305.
Peretyazhko et al. (Mar. 2017) "Smectite Formation in Acid Sulfate Environments on Mars," Lunar and Planetary Science Conference, The Woodlands, TX, 2 pages.
Peretyazhko et al. (publicly available Oct. 2017) "Smectite formation in the presence of sulfuric acid: Implications for acidic smectite formation on early Mars," Geochimica et Cosmochimica Acta (Jan. 2018) 220: 248-260.
Popczun et al. (2014) "Highly Active Electrocatalysis of the Hydrogen Evolution Reaction by Cobalt Phosphide Nanoparticles," Angewandte Chemie 53: 5427-5430.
Popczun et al. (2013) "Nanostructured Nickel Phosphide as an Electrocatalyst for the Hydrogen Evolution Reaction," J. Am. Chem. Soc. 135(25): 9267-9270.
Ryan et al. (1975) "Effect of Surface-applied Sulfuric Acid on Growth and Nutrient Availability of Five Range Grasses in Calcareous Soils," Journal of Range Management 28(5): 411-414.
Search Report and Written Opinion, dated Sep. 6, 2019, corresponding to International Application No. PCT/US2019/032828 (filed May 17, 2019), 16 pp.
Search Report and Written Opinion, dated Nov. 23, 2020, corresponding to International Application No. PCT/US2020/046063 (filed Aug. 13, 2020), 10 pp.
Shaw et al. (2006) "Sulphuric acid decomposition reactions in the sulphur iodine and Westinghouse processes for hydrogen generation," WHEC 16, Lyon France: 1-8.
Simonsen et al. (publicly available Dec. 2019) "Evaluation of mine tailings' potential as supplementary cementitious materials based on

(56) References Cited

OTHER PUBLICATIONS chemical, mineralogical and physical characteristics," Waste Management (Feb. 2020) 102: 710-721.
Singh et al. (2002) "Production of Beneficiated Phosphogypsum for Cement Manufacture," Journal of Scientific & Industrial Research 61: 533-537.
Weidner (2016) "Electrolyzer performance for producing hydrogen via a solar-driven hybrid-sulfur process," J Appl Electrochem 46:829-839.
Zhang et al. (2000) "Reactions between Hydrogen Sulfide and Sulfuric Acid: A Novel Process for Sulfur Removal and Recovery," Industrial & Engineering Chemistry Research 39(7):2505-2509.

\* cited by examiner

| Process Description | Levelized Cost of Hydrogen ($/kg H$_2$) | Kg CO$_2$/kg H$_2$ |
|---|---|---|
| SMR | $1.50 | 11.0 kg |
| Grid Brimstone | $0.95 | 7.7 kg |
| Grid Water Electrolysis | $6.57 | 12.1 kg |
| Solar-Only Brimstone | $2.99 | 0.0 kg |
| Solar-Only Water Electrolysis | $12.80 | 0.0 kg |

Values from VP Chevron Downstream Tech
*Prices taken from Bloomberg market report:
$105/lton sulfur, $95/ston sulfuric acid, no carbon credit

PROCESS TO CONVERT REDUCED SULFUR SPECIES AND WATER INTO HYDROGEN AND SULFURIC ACID

CROSS-REFERENCE TO RELATED APPLICATIONS

This application claims the benefit of priority to U.S. Provisional Patent Application Nos. 62/673,707 filed May 18, 2018, 62/726,858 filed Sep. 4, 2018, 62/743,652 filed Oct. 10, 2018, 62/794,486 filed Jan. 18, 2019, and 62/831,372, filed Apr. 9, 2019, each of which is hereby incorporated by reference in its entirety.

BACKGROUND OF INVENTION

Hydrogen gas and sulfuric acid are useful, independently or together, in a large variety of small-scale and large scale industries. For example, in fertilizer production, sulfuric acid is commonly used to both protonate phosphate rock to make bioavailable phosphoric acid and simply as a source of sulfate in ammonia sulfate and other sulfate fertilizers. Hydrogen gas is used in the fertilizer industry in the Haber-Bosch process to thermochemically make ammonia. Ammonia, sulfuric acid, and phosphoric acid may then combined to make ammonium phosphate and ammonium sulfate fertilizers. Conventionally, in fertilizer production, hydrogen is made by steam methane reforming and sulfuric acid is made by the contact process. Both hydrogen gas and sulfuric acid are also used in oil refining where sulfuric acid is used as a catalyst for alkylation and hydrogen gas is used as a reducing agent to remove sulfur containing compounds from oil and gas in order to produce organic fuels and organic feedstocks for alkylation and other uses. An example of an industry that uses (sulfuric) acid and could use hydrogen is agriculture where (sulfuric) acid is used to acidify irrigation water and hydrogen gas can be used as a clean burning fuel for transportation or electricity generation. Conventionally, farmers either buy sulfuric acid that is produced via the contact process to acidify irrigation water or they buy sulfur burners which burn sulfur to produce $SO_2$ which is then injected into water to produce sulfurous acid ($H_2SO_3$).

Each of the above, and other, industries could benefit from cleaner, less expensive, less energy intensive, on-demand, easily scaled-up or scaled-down, and/or more versatile sources of sulfuric acid and/or hydrogen gas compared to current convention. The methods and systems provided herein can provide all of these benefits to a variety of industries.

SUMMARY OF THE INVENTION

Provided herein are methods and systems for electrochemically producing sulfuric acid and hydrogen gas from sulfur dioxide and in the presence of water, where the sulfur dioxide is formed by thermal conversion of a sulfur-containing species. The methods and systems disclosed herein may include thermally converting (e.g., burning) a sulfur-containing species, such as sulfur powder, to the sulfur dioxide used in the electrochemical portion of the methods and systems. The methods and systems disclosed herein provide a number of advantages for both local production of sulfuric acid and hydrogen gas, such as on a farm, as well as forth large-scale industrial processes such as fertilizer production processes that need sulfuric acid, for example. For example, these methods and systems may be configured to be less energy intensive than certain conventional approaches for producing either one or both of sulfuric acid and hydrogen gas. For example, these methods and systems may emit less $CO_2$ than certain conventional approaches. Additionally, these methods and system provide for on-demand production of sulfuric acid and hydrogen gas, which may be useful to applications such as agriculture and provide the advantage of not requiring a farmer to have expensive and/or dangerous sulfuric acid and/or hydrogen gas storage tanks. As further advantage, these methods and systems may further provide anytime-use (or, on-demand) energy, such as to power agricultural or other equipment and processes, via oxidation of the produced hydrogen gas. In other words, in addition to producing sulfuric acid and hydrogen gas, the system and methods may also be used as a fuel cell.

In an aspect, provided herein are methods for producing sulfuric acid and hydrogen gas, the methods comprising steps of: providing sulfur dioxide formed by thermal conversion of a sulfur-containing species; electrochemically oxidizing said sulfur dioxide to sulfuric acid in the presence of water; and electrochemically forming hydrogen gas via a reduction reaction. In some embodiments, the methods comprise a step of thermally converting said sulfur-containing species to said sulfur dioxide. Systems configured to perform these methods are also disclosed herein.

In an aspect, provided herein are methods for producing sulfuric acid and hydrogen gas, said methods comprising steps of: providing sulfur dioxide formed by thermal conversion of a sulfur-containing species; electrochemically oxidizing said sulfur dioxide to sulfuric acid in the presence of water; and electrochemically forming hydrogen gas via a reduction reaction; wherein said sulfuric acid is characterized by a concentration of at least 70% by mass. Said sulfuric acid concentration can be a concentration, by mass, with respect to the water in the presence of which sulfuric acid is formed by electrochemical oxidation, with respect to the reaction mixture (e.g., including water, and optionally unreacted sulfur dioxide, and optionally dissolved hydrogen, and optionally other reagents and products present in the reaction mixture where and when sulfuric acid is formed by electrochemical oxidation), or optionally with respect to a product stream leaving a vessel wherein the sulfur dioxide is formed via electrochemical oxidation.

In an aspect, provided herein are methods for producing sulfuric acid and hydrogen gas, said methods comprising steps of: providing sulfur dioxide formed by thermal conversion of a sulfur-containing species; electrochemically oxidizing said sulfur dioxide to sulfuric acid in the presence of water; and electrochemically forming hydrogen gas via a reduction reaction; wherein said sulfuric acid is characterized by a concentration of at least 89% by mass. Said sulfuric acid concentration can be a concentration, by mass, with respect to the water in the presence of which sulfuric acid is formed by electrochemical oxidation, with respect to the reaction mixture (e.g., including water, and optionally unreacted sulfur dioxide, and optionally dissolved hydrogen, and optionally other reagents and products present in the reaction mixture where and when sulfuric acid is formed by electrochemical oxidation), or optionally with respect to a product stream leaving a vessel wherein the sulfur dioxide is formed via electrochemical oxidation.

In an aspect, provided herein are methods for producing sulfuric acid and hydrogen gas, said methods comprising steps of: providing sulfur dioxide formed by thermal conversion of a sulfur-containing species; electrochemically oxidizing said sulfur dioxide to sulfuric acid in the presence of water; electrochemically forming hydrogen gas via a reduction reaction; and amending a soil or agricultural water using said sulfuric acid.

In an aspect, provided herein are methods for producing sulfuric acid and hydrogen gas, said methods comprising steps of: providing sulfur dioxide formed by thermal conversion of a sulfur-containing species; electrochemically oxidizing said sulfur dioxide to sulfuric acid in the presence of water; electrochemically forming hydrogen gas via a reduction reaction; and electrochemically oxidizing said hydrogen gas to generate electrical energy.

These methods and systems are compatible with a variety of sulfur-containing species. In some embodiments, the sulfur-containing species is characterized by a sulfur oxidation state of less than +6. In some embodiments, the sulfur-containing species is selected from the group consisting of elemental sulfur, a thiol compound, hydrogen sulfide, polysulfides, and any combination thereof. In some embodiments, the sulfur-containing species comprises elemental sulfur.

These methods and systems are compatible with a variety of process parameters, which may depend on the desired application, for example. In some embodiments, the step of thermally converting said sulfur-containing species to said sulfur dioxide comprises heating or burning said sulfur-containing species. In some embodiments, the step of electrochemically oxidizing the sulfur dioxide is performed in the presence of a catalyst. In some embodiments, the step of electrochemically forming the hydrogen gas is performed in the presence of a catalyst. In some embodiments, the catalyst comprises platinum, platinized titanium, tungsten carbide, gold, and any combination thereof. In some embodiments, the catalyst is selected from the group consisting of platinum, platinized titanium, tungsten carbide, gold, and any combination thereof. Platinum, tungsten carbide, and gold may have any available form or combinations thereof. For example, platinum may correspond to platinum black, Pt/C, platinized titanium, platinum metal, platinum nanoparticles, or any other available form of platinum or material comprising platinum. For example, gold may be a thin film, nanoparticles, or any other available form, or combination thereof. In some embodiments, the steps of electrochemically oxidizing the sulfur dioxide and electrochemically forming the hydrogen gas are electrochemically coupled and are performed concurrently. In some embodiments, the steps of electrochemically oxidizing the sulfur dioxide and electrochemically forming the hydrogen gas are characterized by a current density of at least 100 mA/cm$^2$ at a voltage substantially less than 1.23 V vs. RHE. In contrast, a conventional water electrolysis approach for producing hydrogen gas, for example, requires a voltage greater than 1.23 V vs. RHE. In some embodiments, the steps of electrochemically oxidizing the sulfur dioxide and electrochemically forming the hydrogen gas are characterized by a current density of at least 100 mA/cm$^2$ at a voltage of 500±100 mV vs. SCE (or, ±50 mV vs. SCE) during initial 200 hours of operation of an electrochemical cell performing said steps of electrochemically oxidizing and electrochemically forming. The voltage may depend on the concentration of sulfuric acid, which may itself depend on the application in which these methods and systems are employed. For example, with a sulfuric acid concentration of greater than or equal to 20% by mass (e.g, greater than or equal to 80% by mass, or greater than or equal to 90% by mass), the steps of electrochemically oxidizing the sulfur dioxide and electrochemically forming the hydrogen gas may be characterized by a current density of at least 100 mA/cm$^2$ at a voltage selected from the range of substantially 300 to substantially 1200 mV vs. SCE, or substantially 300 to substantially 400 mV vs. SCE, or substantially 400 to substantially 500 mV vs. SCE, or substantially 500 to substantially 700 mV vs. SCE, or substantially 500 to substantially 800 mV vs. SCE, or substantially 700 to substantially 800 mV vs. SCE, or substantially 800 to substantially 900 mV vs. SCE, or substantially 900 to substantially 1000 mV vs. SCE, or substantially 1000 to substantially 1100 mV vs. SCE, or substantially 1100 to substantially 1200 mV vs. SCE, during the initial at least 10 hours, at least 50 hours, at least 100 hours, or preferably for some applications at least 200 hours of operation of an electrochemical cell performing said steps of electrochemically oxidizing the sulfur dioxide and electrochemically forming the hydrogen gas. For example, with a sulfuric acid concentration of less than 20% by mass, the steps of electrochemically oxidizing the sulfur dioxide and electrochemically forming the hydrogen gas may be characterized by a current density of at least 100 mA/cm$^2$ at a voltage of substantially less than 1200 mV vs. SCE, substantially less than 1000 mV vs. SCE, substantially less than 800 mV vs. SCE, substantially less than 600 mV vs. SCE, substantially less than 500 mV vs. SCE, selected from the range of 300 mV vs. SCE to 1000 mV vs. SCE, selected from the range of 300 mV vs. SCE to 800 mV vs. SCE, selected from the range of 300 mV vs. SCE to 600 mV vs. SCE, selected from the range of 400 mV vs. SCE to 600 mV vs. SCE, or selected from the range of 500 mV vs. SCE to 600 mV vs. SCE, during the initial at least 10 hours, at least 50 hours, at least 100 hours, or preferably for some applications at least 200 hours of operation of an electrochemical cell performing said steps of electrochemically oxidizing the sulfur dioxide and electrochemically forming the hydrogen gas. In some embodiments, the area used to determine current density, or current divided by an area (e.g., mA/cm$^2$), refers to a geometric surface area of an electrode or plurality of electrodes participating in the electrochemical reaction producing said current density. In some embodiments, the method further comprises introducing the sulfur dioxide to an electrochemical cell system configured to perform said steps of electrochemically oxidizing and electrochemically reducing. The electrochemical cell system comprises at least one electrochemical cell. In some embodiments, the method further comprises electrochemically oxidizing said produced hydrogen gas to generate electrical energy. In some embodiments, the steps of electrochemically oxidizing said produced hydrogen gas, electrochemically oxidizing said sulfur dioxide, and electrochemically forming hydrogen gas are performed by an electrochemical cell system; wherein said electrochemical cell system is configured to perform all of said steps of electrochemically oxidizing said hydrogen gas, electrochemically oxidizing said sulfur dioxide, and electrochemically forming hydrogen gas. The step of electrochemically oxidizing the hydrogen gas can be performed sequentially, in any order, with respect to the steps of electrochemically oxidizing said sulfur dioxide and electrochemically forming said hydrogen gas. For example, the steps of steps of electrochemically oxidizing said sulfur dioxide and electrochemically forming said hydrogen gas can be followed by electrochemically oxidizing the hydrogen gas to generate electricity from the hydrogen gas formed during the step of electrochemically forming the hydrogen gas. For example, a system configured to perform these methods may be used as a fuel cell.

In some embodiments, the sulfuric acid is aqueous sulfuric acid. In some embodiments, the electrochemically produced sulfuric acid is characterized by a concentration selected from the range of greater than 0% to substantially 89% by mass. In some embodiments, the sulfuric acid is characterized by a concentration greater than 0% by mass to less than or substantially equal to 98% by mass, or optionally any concentration therebetween, such as a concentration selected from the range of substantially 89% to substantially 98%. For example, the sulfuric acid produced by the methods and systems disclosed herein, such as sulfuric acid output of the methods or systems, is highly concentrated (e.g., greater than or equal to 80%, or greater than or equal to 89%, or substantially 98%), optionally without requiring a separate concentration step or a concentrator. In some embodiments, the solution in which electrochemical production of sulfuric acid and hydrogen gas is occurring is characterized by a bulk concentration of sulfuric acid that is greater than 0% by mass to less than or substantially equal to 98% by mass, or optionally any concentration therebetween, such as a concentration selected from the range of substantially 89% to substantially 98%. Said sulfuric acid concentration can be a concentration, by mass, with respect to the water in the presence of which sulfuric acid is formed by electrochemical oxidation, with respect to the reaction mixture (e.g., including water, and optionally unreacted sulfur dioxide, and optionally dissolved hydrogen, and optionally other reagents and products present in the reaction mixture where and when sulfuric acid is formed by electrochemical oxidation), or optionally with respect to a product stream leaving a vessel wherein the sulfur dioxide is formed via electrochemical oxidation. In some embodiments, the method further comprises concentrating said produced sulfuric acid. For example, the sulfuric acid may be concentrated in preparation for storage thereof. In some embodiments, the methods disclosed herein do not comprise a step of concentrating the sulfuric acid. In some embodiments, the methods disclosed herein do not comprise a step of combining the sulfuric acid and oleum. In some embodiments, the method further comprises diluting said electrochemically produced sulfuric acid to produce a diluted acid solution comprising said electrochemically produced sulfuric acid at a concentration selected from the range of substantially 1% to substantially 10%.

In some embodiments, the sulfur dioxide is substantially in a gas phase. In some embodiments, the sulfur dioxide is substantially in a gas phase during said step of introducing the sulfur dioxide to an electrochemical cell system configured to perform said steps of electrochemically oxidizing and electrochemically reducing. In some embodiments, the step of introducing comprises first dissolving sulfur dioxide in water. In some embodiments, the step of introducing comprising first dissolving sulfur dioxide in an aqueous solution of sulfuric acid characterized by a sulfuric acid concentration selected from the range of 0.01% by mass to substantially 98% by mass, or any concentration therebetween. In some embodiments, the step of introducing comprising first dissolving sulfur dioxide in water free of sulfuric acid or having a sulfuric acid concentration of less than 0.01% by mass.

In some embodiments, the method further comprises amending a soil using said sulfuric acid. In some embodiments, the method further comprises amending agricultural water using said sulfuric acid. In some embodiments, the method further comprises amending a soil using the sulfuric acid and amending agricultural water using the sulfuric acid. Agricultural water may be, but is not limited to, irrigation water. In some embodiments, the step of amending soil comprises adding said sulfuric acid to said soil. In some embodiments, the step of amending agricultural water comprises adding said sulfuric acid to said agricultural water. In some embodiments, the method further comprises introducing said produced sulfuric acid to a fertilizer production process. In some embodiments, the method further comprises introducing said produced sulfuric acid to an oil refining process. In some embodiments, the method further comprises introducing said produced sulfuric acid to a paper manufacturing process. In some embodiments, the method further comprises storing said produced hydrogen gas. In some embodiments, the method further comprises introducing said produced hydrogen gas to a fuel cell. In some embodiments, the method further comprises removing plated sulfur or sulfur fouling from an electrode used for the electrochemically oxidizing or the electrochemically forming.

In an aspect, also provided herein are systems for producing sulfuric acid and hydrogen gas, the systems comprising: an electrochemical cell configured to (i) electrochemically oxidize a sulfur dioxide to said sulfuric acid in the presence of water and (ii) electrochemically form hydrogen gas via a reduction reaction, such that the electrochemical cell electrochemically produces the sulfuric acid and the hydrogen gas; wherein said sulfur dioxide is formed by thermal conversion of a sulfur-containing species.

In an aspect, also provided herein are systems for producing sulfuric acid and hydrogen gas, the systems comprising: an electrochemical cell configured to (i) electrochemically oxidize a sulfur dioxide to said sulfuric acid in the presence of water and (ii) electrochemically form hydrogen gas via a reduction reaction, such that the electrochemical cell electrochemically produces the sulfuric acid and the hydrogen gas; wherein said sulfur dioxide is formed by thermal conversion of a sulfur-containing species; and wherein said electrochemically produced sulfuric acid is characterized by a concentration of at least 89% by mass. In some embodiments, the system does not comprise a concentrator for concentrating the sulfuric acid. In some embodiments, the electrochemically produced sulfuric acid is characterized by a concentration selected from the range of substantially 89% to substantially 98% by mass. In some embodiments, the electrochemically produced sulfuric acid is characterized by a concentration selected from the range of greater than 0% to substantially 89% by mass. Said sulfuric acid concentration can be a concentration, by mass, with respect to the water in the presence of which sulfuric acid is formed by electrochemical oxidation, with respect to the reaction mixture (e.g., including water, and optionally unreacted sulfur dioxide, and optionally dissolved hydrogen, and optionally other reagents and products present in the reaction mixture where and when sulfuric acid is formed by electrochemical oxidation), or optionally with respect to a product stream leaving a vessel wherein the sulfur dioxide is formed via electrochemical oxidation. In some embodiments, the system further comprises a diluter to produce a diluted acid solution comprising said electrochemically produced sulfuric acid at a concentration selected from the range of substantially 1% to substantially 10%.

In an aspect, also provided herein are systems for producing sulfuric acid and hydrogen gas, the systems comprising: an electrochemical cell configured to (i) electrochemically oxidize a sulfur dioxide to said sulfuric acid in the presence of water and (ii) electrochemically form hydrogen gas via a reduction reaction, such that the electrochemical cell electrochemically produces the sulfuric acid and the hydrogen gas; wherein said sulfur dioxide is formed by thermal conversion of a sulfur-containing species; and an amendment apparatus; said amendment apparatus being configured to provide for amending a soil using said sulfuric acid or configured to provide for amending agricultural water using said sulfuric acid; wherein amending agricultural water corresponds to adding said sulfuric acid to said agricultural water.

In an aspect, also provided herein are systems for producing sulfuric acid and hydrogen gas, the systems comprising: an electrochemical cell configured to (i) electrochemically oxidize a sulfur dioxide to said sulfuric acid in the presence of water and (ii) electrochemically form hydrogen gas via a reduction reaction, such that the electrochemical cell electrochemically produces the sulfuric acid and the hydrogen gas; wherein said sulfur dioxide is formed by thermal conversion of a sulfur-containing species; and wherein the electrochemical cell is further configured to electrochemically oxidizing said hydrogen gas to generate electrical energy.

In some embodiments, the system comprises a burner configured to convert said sulfur-containing species to sulfur dioxide. In some embodiments, the system comprises a concentrator for concentrating said sulfuric acid. In some embodiments, the system comprises sulfur dioxide feed apparatus configured to dissolve the sulfur dioxide in the water. In some embodiments, the feed apparatus is configured to dissolve the sulfur dioxide in an aqueous solution of sulfuric acid characterized by a sulfuric acid concentration selected from the range of 0.01% by mass to substantially 98% by mass. In some embodiments, the system comprises an amendment apparatus configured to provide for amending a soil using said sulfuric acid; wherein amending soil corresponds to adding said sulfuric acid to said soil. In some embodiments, the system comprises an amendment apparatus configured to provide for amending agricultural water using said sulfuric acid; wherein amending agricultural water corresponds to adding said sulfuric acid to said agricultural water. In some embodiments, the electrochemical cell is further configured to electrochemically oxidizing said hydrogen gas to generate electrical energy. For example, the electrochemical cell can be a fuel cell.

Also disclosed herein are methods for producing sulfuric acid and hydrogen gas including any one or any combination of embodiments of methods and systems disclosed herein. Also disclosed herein are systems for producing sulfuric acid and hydrogen gas including any one or any combination of embodiments of methods and systems disclosed herein.

Also provided herein are additional or alternative methods and systems for producing sulfuric acid and hydrogen gas. In an aspect, an alternative method for producing sulfuric acid and hydrogen gas comprises steps of: electrochemically forming the sulfuric acid and the hydrogen gas in a mixture comprising a sulfur material, a supporting acid, and water. In certain embodiments of the alternative method for producing sulfuric acid and hydrogen gas, the sulfur material is characterized by an oxidation state of 0. In certain embodiments of the alternative method for producing sulfuric acid and hydrogen gas, the sulfur material is elemental sulfur, $HS^-$, $H_2S$, or any combination of these. In certain embodiments of the alternative method for producing sulfuric acid and hydrogen gas, the step of electrochemically forming is characterized by the formula FX1: $1/X\ S_X+YO_2+ZH_2O \rightarrow H_2SO_4+(Z-1)H_2$ (FX1): wherein: X is an integer selected from the range of 1 to 8; Y is 0, ½, or 1; and Z is 1, 2, 3, or 4. The term "$S_x$" in formula FX1 may refer to an elemental sulfur. In certain embodiments of the alternative method for producing sulfuric acid and hydrogen gas, Z is 3 or 4. In certain embodiments of the alternative method for producing sulfuric acid and hydrogen gas, X is 8, Y is 0, and Z is 4. A supporting acid is, for example, an acid that provides favorable conditions for the electrochemical forming step. For example, a supporting acid is provided, at a determined amount, to raise the boiling point of a liquid solution or liquid mixture such that the liquid solution or liquid mixture substantially does not boil under the conditions in which the electrochemically forming step proceeds, wherein the conditions may include a temperature greater than 100° C., such as a temperature that is equal to or greater than a melting point of an elemental sulfur. In some embodiments, the supporting acid is other than sulfuric acid. In some embodiments, the supporting acid is sulfuric acid.

In certain embodiments of the alternative method for producing sulfuric acid and hydrogen gas, the mixture has a temperature selected from the range of 118° C. to 160° C., optionally selected from the range of 100° C. to 200° C., optionally selected from the range of 90° C. to 200° C., or optionally selected from the range of 115° C. to 180° C., during the step of electrochemically forming. In certain embodiments of the alternative method for producing sulfuric acid and hydrogen gas, the step of electrochemically forming is characterized by a current density of substantially greater than 10 mA/cm$^2$, optionally at least 20 mA/cm$^2$, optionally at least 50 mA/cm$^2$, optionally at least 100 mA/cm$^2$, or optionally for some embodiments optionally at least 500 mA/cm$^2$, at a voltage of substantially less than 1.23 V vs. NHE, or optionally at a voltage of substantially less than 1 V vs. NHE. In certain embodiments of the alternative method for producing sulfuric acid and hydrogen gas, the step of electrochemically forming is characterized by a current density of at least 10 mA/cm$^2$, optionally at least 20 mA/cm$^2$, optionally at least 50 mA/cm$^2$, optionally at least 100 mA/cm$^2$, or optionally for some embodiments optionally at least 500 mA/cm$^2$, at a voltage of selected from the range of 0.6 to 0.8 V vs. NHE, or optionally at a voltage selected from the range of 0.5 V to 1 V vs. NHE. In certain embodiments of the alternative method for producing sulfuric acid and hydrogen gas, the step of electrochemically forming is characterized by a current density of substantially greater than 10 mA/cm$^2$, optionally at least 20 mA/cm$^2$, optionally at least 50 mA/cm$^2$, optionally at least 100 mA/cm$^2$, or optionally for some embodiments optionally at least 500 mA/cm$^2$, at a voltage of substantially less than 1.23 V vs. NHE, or optionally at a voltage of substantially less than 1 V vs. NHE, during the initial at least 200 hours of operation of an electrochemical cell performing the step of electrochemically forming. In certain embodiments of the alternative method for producing sulfuric acid and hydrogen gas, the step of electrochemically forming is characterized by a voltage less than 1.23 V vs. NHE or a voltage selected from the range of 1 to 2.5 V vs. NHE. In certain embodiments of the alternative method for producing sulfuric acid and hydrogen gas, the step of electrochemically forming is characterized by a voltage selected from the range of 0.5 to 3 V vs. NHE. In certain embodiments of the alternative method for producing sulfuric acid and hydrogen gas, the step of electrochemically forming is characterized by a current density of at least 0.5 A/cm$^2$, optionally at least 1 A/cm$^2$, optionally at least 2 A/cm$^2$, optionally at least 5 A/cm$^2$, or optionally for some embodiments at least 10 A/cm$^2$. In certain embodiments of the alternative method for producing sulfuric acid and hydrogen gas, the step of electrochemically forming is characterized by an energy consumption of 35 to 80 kWhr per kg of produced hydrogen gas, or optionally for some embodiments an energy consumption of 60 to 80 kWhr per kg of produced hydrogen gas.

In certain embodiments of the alternative method for producing sulfuric acid and hydrogen gas, a mass fraction of the sulfur material in the mixture is selected from the range of 0.1 to 0.99, or any value or range therebetween inclusively, during the step of electrochemically forming. In certain embodiments of the alternative method for producing sulfuric acid and hydrogen gas, the sulfur material in the mixture is molten sulfur. In certain embodiments of the alternative method for producing sulfuric acid and hydrogen gas, an amount of the supporting acid in the mixture during the step of electrochemically forming is selected from the range of 10 mass % to 80 mass %, or any value or range therebetween inclusively, such as optionally selected from the range of 20 mass % to 70 mass %, or optionally for some embodiments selected from the range of 20% to 40%, with respect to the mixture. Generally, the amount of supporting acid in the mixture during the step of electrochemically forming is selected to be an amount such that the water and acid in the mixture do not boil (or, such that the boiling point of liquid in the mixture is above the melting point of sulfur in the mixture) during the step of electrochemically forming. For example, if the supporting acid is perchloric acid, it may be present at substantially 60 mass %. For example, if the supporting acid is sulfuric acid, it may be present at substantially 30 mass %. In certain embodiments of the alternative method for producing sulfuric acid and hydrogen gas, the supporting acid is sulfuric acid. In certain embodiments of the alternative method for producing sulfuric acid and hydrogen gas, the mixture is exposed to at least one of a first catalyst and a second catalyst during the step of electrochemically forming.

In certain embodiments of the alternative method for producing sulfuric acid and hydrogen gas, the step of electrochemically forming is performed via a positive electrode and a negative electrode in an electrochemical cell. In certain embodiments of the alternative method for producing sulfuric acid and hydrogen gas, the compositions of the positive electrode and the negative are substantially identical. In certain embodiments of the alternative method for producing sulfuric acid and hydrogen gas, the compositions of the positive electrode and the negative electrode are substantially different with respect to each other. In certain embodiments of the alternative method for producing sulfuric acid and hydrogen gas, a composition of the positive electrode and/or the negative electrode is substantially equivalent to a composition of the first catalyst and/or the second catalyst. In certain embodiments of the alternative method for producing sulfuric acid and hydrogen gas, a composition of the positive electrode and/or the negative electrode is substantially different from a composition of the first catalyst and/or the second catalyst. In certain embodiments of the alternative method for producing sulfuric acid and hydrogen gas, the positive electrode is the first catalyst or the second catalyst. In certain embodiments of the alternative method for producing sulfuric acid and hydrogen gas, the negative electrode is the first catalyst or the second catalyst.

In certain embodiments of the alternative method for producing sulfuric acid and hydrogen gas, the step of electrochemically forming comprises electrochemically oxidizing the sulfur material in the presence of a first catalyst. In certain embodiments of the alternative method for producing sulfuric acid and hydrogen gas, the step of electrochemically forming comprises a reduction reaction to form hydrogen gas, the reduction reaction occurring in the presence of a second catalyst. In certain embodiments of the alternative method for producing sulfuric acid and hydrogen gas, the first catalyst comprises Pt, Ru, Ir, tungsten carbide, Au, Ag, or any combination of these. In certain embodiments of the alternative method for producing sulfuric acid and hydrogen gas, the second catalyst comprises a hydrogen evolution catalyst or a catalyst comprising Pt, stainless steel, Ni, MoS, Cobalt phosphide, or any combination of these.

In certain embodiments of the alternative method for producing sulfuric acid and hydrogen gas, the mixture further comprises dissolved oxygen. In certain embodiments of the alternative method for producing sulfuric acid and hydrogen gas, the dissolved oxygen is provided via bubbling a gas comprising $O_2$, such as substantially pure $O_2$ or air.

In certain embodiments of the alternative method for producing sulfuric acid and hydrogen gas, an amount of water in the mixture is selected from the range of 1 mass % to 99 mass %, or any value or range therebetween inclusively, during the step of electrochemically forming. In certain embodiments of the alternative method for producing sulfuric acid and hydrogen gas, the mixture is characterized by a pH less than or equal to 7 during the step of electrochemically forming.

In certain embodiments of the alternative method for producing sulfuric acid and hydrogen gas, an amount of sulfuric acid in the mixture during the step of electrochemically forming is selected from the range of 0 mass % to 98 mass %. For example, an amount of sulfuric acid in the mixture immediately prior to initially performing the step of electrochemically forming (a time zero) may be 0 mass %. In certain embodiments of the alternative method for producing sulfuric acid and hydrogen gas, an amount of sulfuric acid in the mixture during the step of electrochemically forming is selected from the range of greater than 0 mass % to 98 mass %, or any value or range therebetween inclusively. In certain embodiments of the alternative method for producing sulfuric acid and hydrogen gas, an amount of sulfuric acid in the mixture is selected from the range of 1 mass % to 98 mass %, or any value or range therebetween inclusively. In certain embodiments of the alternative method for producing sulfuric acid and hydrogen gas, a molar ratio of the quantity of hydrogen gas produced to the quantity of sulfuric acid produced during the step of electrochemically forming is substantially equal to 3 or is substantially greater than 1.

In certain embodiments of the alternative method for producing sulfuric acid and hydrogen gas, the method comprises a step of extracting the sulfuric acid from the mixture. In certain embodiments of the alternative method for producing sulfuric acid and hydrogen gas, the method is a continuous process, wherein the step of electrochemically forming and the step of extracting are performed concurrently. In certain embodiments of the alternative method for producing sulfuric acid and hydrogen gas, the method comprises a step of forming the mixture comprising sulfur material, supporting acid, and water. In certain embodiments of the alternative method for producing sulfuric acid and hydrogen gas, the method comprises heating the mixture to a temperature such that the sulfur material is molten sulfur. In certain embodiments of the alternative method for producing sulfuric acid and hydrogen gas, the method comprises extracting or collecting the produced hydrogen gas. In certain embodiments of the alternative method for producing sulfuric acid and hydrogen gas, the method comprises introducing the produced sulfuric acid, the produced hydrogen gas, or both the produced sulfuric acid and the In certain embodiments of the alternative method for producing sulfuric acid and hydrogen gas, the method comprises amending a soil via the produced sulfuric acid. In certain embodiments of the alternative method for producing sulfuric acid and hydrogen gas, the method comprises introducing the produced sulfuric acid, the produced hydrogen gas, or both the produced sulfuric acid and the produced hydrogen gas to an oil refining process. In certain embodiments of the alternative method for producing sulfuric acid and hydrogen gas, the method comprises introducing the produced sulfuric acid, the produced hydrogen gas, or both the produced sulfuric acid and the produced hydrogen gas to a paper manufacturing process. In certain embodiments of the alternative method for producing sulfuric acid and hydrogen gas, the method comprises electrochemically oxidizing the produced hydrogen gas to generate electrical energy. In certain embodiments of the alternative method for producing sulfuric acid and hydrogen gas, the method comprises storing the produced hydrogen gas. In certain embodiments of the alternative method for producing sulfuric acid and hydrogen gas, the method comprises introducing the produced hydrogen gas to a fuel cell. In certain embodiments of the alternative method for producing sulfuric acid and hydrogen gas, the step of electrochemically forming is performed via an electrochemical cell. In some embodiments, the method further comprises removing plated sulfur or sulfur fouling from an electrode used for the electrochemically forming.

Also provided herein are systems capable of and configured to produce sulfuric acid and hydrogen gas according to any method for producing sulfuric acid and hydrogen gas disclosed herein or any combination of embodiments thereof disclosed herein. The systems disclosed herein for producing sulfuric acid and hydrogen gas may include any conventional or art-known features or elements that may be needed, as recognized by one of ordinary skill in the art, to operate according to any method disclosed herein for producing sulfuric acid and hydrogen gas.

In an aspect, a system for producing sulfuric acid and hydrogen gas comprises: an electrochemical cell configured to electrochemically form the sulfuric acid and the hydrogen gas in a mixture comprising a sulfur material, a supporting acid, and water. In certain embodiments of a system for producing sulfuric acid and hydrogen gas, the system comprises a heater to maintain the mixture at a temperature selected from the range of 80° C. to 200° C., or any temperature value or range therebetween inclusively, during electrochemical formation of sulfuric acid and hydrogen gas. In certain embodiments of a system for producing sulfuric acid and hydrogen gas, the system comprises an acid extraction apparatus for extracting produced sulfuric acid from the electrochemical cell. In certain embodiments of a system for producing sulfuric acid and hydrogen gas, the system comprises a hydrogen gas collector for collecting the produced hydrogen gas from the electrochemical cell. In certain embodiments of a system for producing sulfuric acid and hydrogen gas, the system comprises a first reservoir comprising the supporting acid, the sulfuric acid, the water, or any combination thereof for providing the supporting acid, the sulfuric acid, the water, or any combination thereof to the electrochemical cell. In certain embodiments of a system for producing sulfuric acid and hydrogen gas, the system comprises a second reservoir comprising sulfur or molten sulfur for providing the sulfur material or the molten sulfur to the electrochemical cell. In certain embodiments of a system for producing sulfuric acid and hydrogen gas, the system is free of a membrane for exchange off anion(s), cation(s), electrolyte(s), solvent(s), water, or any combination of these within the electrochemical cell. In certain embodiments of a system for producing sulfuric acid and hydrogen gas, the system is free of a frit for exchange off anion(s), cation(s), electrolyte(s), solvent(s), water, or any combination of these within the electrochemical cell. In some embodiments, a frit is an exemplary membrane. An exemplary membrane is, but is not limited to, a proton exchange membrane. An exemplary membrane or frit is, but is not limited to, a porous plastic material.

Also provided herein are methods and systems for producing a sulfuric acid and hydrogen gas according to any one or any combination of embodiments of the methods and/or system disclosed herein.

Also provided herein are methods and associated systems for producing cement or a cement material, which offer a variety of advantages over conventional methods and systems. For example, the disclosed methods may be performed at lower temperatures. For example, the disclosed methods may include production of hydrogen which may be used to provide energy, such as via burning or via a fuel cell, for one or more other steps of these methods. For example, the disclosed methods may produce a stream of $CO_2$ that is >90% $CO_2$ on a mass basis. For example, the disclosed methods may produce a bicarbonate instead of or in addition to producing $CO_2$. Therefore, these methods translate to reduced operational cost, reduced environmental impact, and possibly reduced capital expenses.

In an aspect, a method for producing a cement material comprises steps of: (step (a)) reacting sulfur dioxide and water to form a first acid, the first acid comprising at least one sulfur-containing anion; (step (b)) reacting the first acid and a first cement precursor to form a second cement precursor; wherein the second cement precursor comprises the at least one sulfur-containing anion; and (step (c)) converting the second cement precursor to the cement material. In certain embodiments of the method for producing a cement material, the sulfur-containing anion is a sulfate ($SO_4$) or a sulfite ($SO_3$). In certain embodiments of the method for producing a cement material, each of the cement material, the first cement precursor, and the second cement precursor comprises an element selected from the group consisting of Ca, Si, Al, and a combination of these. In certain embodiments of the method for producing a cement material, each of the cement material, the first cement precursor, and the second cement precursor comprises Ca. In certain embodiments of the method for producing a cement material, the cement material is calcium oxide (CaO). In certain embodiments of the method for producing a cement material, the first cement precursor is calcium carbonate ($CaCO_3$).

Certain embodiments of the method for producing a cement material include the production of sulfuric acid and hydrogen. In certain embodiments of the method for producing a cement material, the sulfur-containing anion is sulfate ($SO_4$); the first acid is sulfuric acid ($H_2SO_4$); the step (a) comprises (i) electrochemically oxidizing the sulfur dioxide to the sulfuric acid electrochemically and (ii) forming hydrogen gas via a reduction reaction; and the sulfur dioxide and the water are reacted at a ratio of 1:2, respectively, during step (a). In certain embodiments of the method for producing a cement material, the step (a) is performed according to formula FX1: $SO_2+2H_2O \rightarrow H_2SO_4+H_2$ (FX1). In certain embodiments of the method for producing a cement material, the second cement precursor is calcium sulfate ($CaSO_4$). In certain embodiments of the method for producing a cement material, the step (c) is performed according to formula FX3: $CaSO_4 \rightarrow CaO+SO_2+\frac{1}{2}O_2$ (FX3). In certain embodiments of the method for producing a cement material, the step (c) is performed at a temperature selected from the range of 500° C. to 2000° C., optionally at a temperature selected from the range of 1000° C. to 2000° C., optionally at a temperature selected from the range of 1200° C. to 1600° C., preferably for some applications at a temperature less than or equal to 1450° C., or preferably for some applications at a temperature less than or equal to 1000° C. The temperature at which the step (c) is performed may corresponds to an appropriate or required temperature for sintering or thermally decomposing the second cement precursor thereby forming the cement material. The minimum temperature needed for sintering or thermally decomposing the second cement precursor, in order to achieve step (c), may be varied by including one or more additives (such as CaS) with the second cement precursor during the sintering thereof because the inclusion of one or more additives may reduce the sinter or thermal decomposition temperature of the second cement precursor. For example, the temperature may depend on the particular cement material produced, such as that lower temperatures (e.g., 600° C.) may be used to produce CaO compared to other cement material or a composite cement (such as Portland cement). In certain embodiments of the method for producing a cement material, the steps of electrochemically oxidizing the sulfur dioxide and electrochemically forming the hydrogen gas are performed in the presence of a catalyst. In certain embodiments of the method for producing a cement material, the steps of electrochemically oxidizing the sulfur dioxide and electrochemically forming the hydrogen gas are electrochemically coupled and are performed concurrently. In certain embodiments of the method for producing a cement material, the steps of electrochemically oxidizing the sulfur dioxide and electrochemically forming the hydrogen gas are characterized by a current density of at least 1 A/cm$^2$ geometric surface area at a voltage of less than 1 V vs. RHE. In certain embodiments of the method for producing a cement material, during step (b) the sulfuric acid is aqueous sulfuric acid characterized by a concentration selected from the range of 0.0001% to 98%, optionally for some embodiments selected from the range of 0.0001% to 50%, optionally for some embodiments selected from the range of 0.0001% to 25%, optionally for some embodiments selected from the range of 0.0001% to 10%, optionally for some embodiments selected from the range of 0.0001% to 5%, optionally for some embodiments selected from the range of 0.0001% to 1%, or optionally for some embodiments selected from the range of 0.0001% to 0.1%. In certain embodiments of the method for producing a cement material, the method comprises burning at least a fraction of the formed hydrogen gas to provide heat for step (c).

Certain embodiments of the method for producing a cement material include the production of sulfuric acid and hydrogen via an electrochemical process, where the sulfuric acid may be used to acidify a cement precursor. In some embodiments of such a method, the method does not include a carbon capture and/or storage process or reaction. In certain embodiments of the method for producing a cement material, step (b) comprises producing carbon dioxide ($CO_2$) and water, wherein the produced carbon dioxide is produced as a result of reacting the first acid and a first cement precursor. In certain embodiments of the method for producing a cement material, during step (b) the sulfuric acid and the first cement precursor are reacted at a ratio of 1:1, respectively. In certain embodiments of the method for producing a cement material, the first cement precursor is calcium carbonate ($CaCO_3$) or comprises calcium carbonate ($CaCO_3$) (such as limestone, which comprises calcium carbonate) and wherein step (b) is performed according to formula FX2a: $H_2SO_4 + CaCO_3 \rightarrow CaSO_4 + CO_2 + H_2O$ (FX2a). In certain embodiments of the method for producing a cement material, step (b) comprises a combination of a reaction according to formula FX2a and a reaction according to formula FX2b. In certain embodiments of the method for producing a cement material, the method is characterized by a net reaction having the formula FX4a: $CaCO_3 + H_2O \rightarrow H_2 + CaO + \frac{1}{2}O_2 + CO_2$ (FX4a). In certain embodiments of the method for producing a cement material, step (b) is characterized by an efficiency of at least 99%. For example, efficiency of a step may correspond to a compositional purity of a product of the step, such as purity of cement (e.g., CaO), such as with respect to presence or absence of gypsum and calcium carbonate. The efficiency may be determined using x-ray diffraction to determine a purity of a produced material (e.g., the cement material), subject to a detection limit of the x-ray diffraction technique. A detection limit of the x-ray diffraction is for example 99%. In certain embodiments of the method for producing a cement material, step (b) is characterized by an efficiency of at least 99% for conversion of $CaCO_3$ to $CaSO_4$. For example, efficiency is determined by measuring resulting CaO and intermediate $CaSO_4$ using x-ray diffraction, using a 2 hr reaction time for carbon capture and storage, a 1 minute reaction time for acid mixing, and 1450° C. for sintering (step c), all of which are parameters which may be varied. Carbon capture and storage is measured with a Total Inorganic Carbon (TIC) analyzer and recording how much carbon made it into solution.

Certain embodiments of the method for producing a cement material include the production of sulfuric acid and hydrogen via an electrochemical process, where the sulfuric acid may be used to acidify a cement precursor. In some embodiments of such a method, the method includes a carbon capture process and/or storage reaction. In certain embodiments of the method for producing a cement material, step (b) comprises producing a bicarbonate ($HCO_3$) anion. In certain embodiments of the method for producing a cement material, step (b) comprises producing between 25% and 100% $CO_2$, which is optionally captured and/or sold or released into the atmosphere. In certain embodiments of the method for producing a cement material, during step (b) the sulfuric acid and the first cement precursor are reacted at a ratio of 1:2, respectively. In certain embodiments of the method for producing a cement material, the first cement precursor is calcium carbonate ($CaCO_3$) or comprises calcium carbonate (such as limestone); and wherein step (b) is performed according to formula FX2b: $H_2SO_4 + 2CaCO_3 \rightarrow CaSO_4 + Ca^{2+} + 2HCO_3^-$ (FX2b). In certain embodiments of the method for producing a cement material, step (b) comprises a combination of a reaction according to formula FX2a and a reaction according to formula FX2b. In embodiments wherein step (b) is performed according to reaction FX2b, but not according to FX2a, in order to capture a substantial fraction of the bicarbonate formed in the reaction, a large volume of water is needed, and that large volume of water may dissolve a large fraction of the gypsum, thereby the reaction may be made inefficient in terms of cement production. When acid is reacted with the $CaCO_3$, pure $CO_2$ can be produced which can be used for carbon capture and storage. In certain embodiments of the method for producing a cement material, the method is characterized by a net reaction having the formula FX4b: $2CaCO_3 + 2H_2O \rightarrow H_2 + CaO + \frac{1}{2}O_2 + Ca^{2+} + 2HCO_3^-$ (FX4b). In certain embodiments of the method for producing a cement material, step (b) is characterized by an efficiency of at least 99%. For example, efficiency of a step may correspond to a compositional purity of a product of the step, such as purity of cement (e.g., CaO). In certain embodiments of the method for producing a cement material, step (b) is characterized by an efficiency of at least 99% for conversion of $CaCO_3$ to $CaSO_4$. In certain embodiments of the method for producing a cement material, step (b) is characterized by a conversion efficiency of $CO_2$ to $HCO_3^-$ of at least or substantially equal to 45.5% after 2 hours of reaction. For example, step (b) may include the following: sulfuric acid rapidly reacts with a fraction (e.g., half) of the $CaCO_3$ to produce $CO_2$ and then hydrated $CO_2$ (or carbonic acid) reacts with the remaining $CaCO_3$ to produce bicarbonate ($HCO_3^-$). These reactions correspond to: $CO_2+H_2O \rightarrow H_2CO_3$ then $CaCO_3+H_2CO_3 \rightarrow Ca^{2+}+2HCO_3^-$. For example, sulfuric acid is added to the carbonate which degasses $CO_2$; this $CO_2$ is then mixed with another solution that contains water and limestone or $CaCO_3$ for 2 hours. After 2 hours, 45% of that $CO_2$ is captured in solution as $HCO_3$ as measured by a TIC analyzer. It is noted that captured $CO_2$ may be characterized via a TIC analyzer. An exemplary TIC analyzer is a multi N/CAO Series Analytical System by Analytik Jena (for example, see www.analytik-jena.com/products/sum-parameter-analysis/toctnb-analysis/multi-nc/ or www.labcompare.com/21-Total-Organic-Carbon-Analyzer-TOC-Analyzers/12809864-multi-N-C-Series-Analytical-Systems/?pda=61771|2809864_1_0|||&dfp=true. It will be understood by one of skill in the art that certain reactions represented herein may be equilibrium reactions and/or incomplete reactions in practice, and that the symbol "→" is not intended to be exclusive of an equilibrium reaction (which may also be represented as "↔").

In certain embodiments, the method for producing a cement material comprises forming sulfurous acid and acidifying a cement precursor with the sulfurous acid. In certain embodiments of the method for producing a cement material, the sulfur-containing anion is sulfite ($SO_3^{2-}$); the first acid is sulfurous acid ($H_2SO_3$). The sulfur dioxide and the water may be reacted at a ratio equal to or less than (e.g., if excess water) 1:1, respectively, during step (a). In certain embodiments of the method for producing a cement material, the step (a) is performed according to formula FX5: $SO_2+H_2O \rightarrow H_2SO_3$ (FX5). In certain embodiments of the method for producing a cement material, the second cement precursor is calcium sulfite ($CaSO_3$). In certain embodiments of the method for producing a cement material, the step (c) is performed according to formula FX7: $CaSO_3 \rightarrow CaO+SO_2$ (FX7). In certain embodiments of the method for producing a cement material, the step (c) is performed at a temperature selected from the range of 500° C. to 2000° C., optionally at a temperature selected from the range of 1000° C. to 2000° C., optionally at a temperature selected from the range of 1200° C. to 1600° C., preferably for some applications at a temperature less than or equal to 1450° C., or preferably for some applications at a temperature less than or equal to 1000° C.. For example, the temperature may depend on the particular cement material produced, such as that lower temperatures (e.g., 600° C.) may be used to produce CaO compared to other cement material or a composite cement (such as Portland cement).

In certain embodiments, the method for producing a cement material comprises forming sulfurous acid and acidifying a cement precursor with the sulfurous acid. In some embodiments of such a method, the method does not include a carbon capture and/or reaction. In certain embodiments of the method for producing a cement material, step (b) comprises producing carbon dioxide ($CO_2$) and water. In certain embodiments of the method for producing a cement material, during step (b) the sulfurous acid and the first cement precursor are reacted at a ratio of 1:1, respectively. In certain embodiments of the method for producing a cement material, the first cement precursor is calcium carbonate ($CaCO_3$) or comprises calcium carbonate ($CaCO_3$); and wherein step (b) is performed according to formula FX6a: $H_2SO_3+CaCO_3 \rightarrow CaSO_3+CO_2+H_2O$ (FX6a). In certain embodiments of the method for producing a cement material, step (b) comprises a combination of a reaction according to formula FX6a and a reaction according to formula FX6b. Due to low solubility of $CaSO_3$, having step (b) comprise both reaction according to FX6a and reaction according to FX6b, in the same reaction chamber, may be a preferred option, according to certain embodiments. Also, the $CO_2$ released from dissolving $CaCO_3$ can be pure $CO_2$ which is another product which could be used in food or could be store and/or sold. Reaction according to FX6a may be performed with or without providing water, except for the water producing via and during the reaction according to FX6a. In certain embodiments of the method for producing a cement material, the method is characterized by a net reaction having the formula FX8a: $CaCO_3 \rightarrow CaO+CO_2$ (FX8a).

In certain embodiments, the method for producing a cement material comprises forming sulfurous acid and acidifying a cement precursor with the sulfurous acid. In some embodiments of such a method, the method does include a carbon capture and/or storage reaction. In certain embodiments of the method for producing a cement material, step (b) does not comprise producing carbon dioxide ($CO_2$). In certain embodiments of the method for producing a cement material, step (b) comprises producing a bicarbonate ($HCO_3$) anion. In certain embodiments of the method for producing a cement material, during step (b) the sulfurous acid and the first cement precursor are reacted at a ratio of 1:2, respectively. In certain embodiments of the method for producing a cement material, the first cement precursor is calcium carbonate ($CaCO_3$) or comprises calcium carbonate ($CaCO_3$), and wherein step (b) is performed according to formula FX6b: $H_2SO_3+2CaCO_3 \rightarrow CaSO3+Ca^{2+}+2HCO_3^-$ (FX6b). In certain embodiments of the method for producing a cement material, step (b) comprises a combination of a reaction according to formula FX6a and a reaction according to formula FX6b. In certain embodiments of the method for producing a cement material, step (b) comprises a combination of a reaction according to formula FX6a and a reaction according to formula FX6b. Due to low solubility of $CaSO_3$, having step (b) comprise both reaction according to FX6a and reaction according to FX6b, in the same reaction chamber, may be a preferred option, according to certain embodiments. Also, the $CO_2$ released from dissolving $CaCO_3$ can be pure $CO_2$ which is another product which could be used in food or could be stored and/or sold. Reaction according to FX6a may be performed with or without providing water, except for the water produced via and during the reaction according to FX6a. In certain embodiments of the method for producing a cement material, step (b) comprises a combination of a reaction according to formula FX6a and a reaction according to formula FX6b. In certain embodiments of the method for producing a cement material, the method is characterized by a net reaction having the formula FX8b: $2CaCO_3+H_2O+heat \rightarrow CaO+Ca^{2+}+2HCO_3^-$ (FX8b).

In certain embodiments of the method for producing a cement material, the method further comprises at least one of storing and recycling liquid comprising calcium ions and bicarbonate ions, wherein the calcium ions and bicarbonate ions are formed during step (b).

In certain embodiments of the method for producing a cement material, sulfur dioxide is produced during step (c), the method further comprising recycling the sulfur dioxide produced during step (c) to provide for the sulfur dioxide reacted during step (a).

In certain embodiments of the method for producing a cement material, step (c) includes heating the second cement precursor to convert it to the cement material. The heating step may include a sintering process, in which the second cement precursor is sintered to convert the second cement precursor into the cement material, either in the presence or in the absence of an additive. In certain embodiments of the method for producing a cement material, step (c) comprises heating the second cement precursor in the presence of an additive to form a composite cement material, the composite cement material comprising the cement material. In certain embodiments of the method for producing a cement material, the additive comprises silica, alumina, iron oxide, other metals, other metals oxides, or any combination of these. In certain embodiments of the method for producing a cement material, the composite cement material comprises silica, alumina, iron oxide, other metals, other metal oxides, or any combination of these. In certain embodiments of the method for producing a cement material, step (b) comprises providing the additive. In certain embodiments of the method for producing a cement material, step (c) comprises providing the additive.

In certain embodiments of the method for producing a cement material, step (b) is performed without providing water during the reaction, except for the water produced by the reaction during step (b), such that step (b) is performed substantially as a dry reaction. In certain embodiments of the method for producing a cement material, step (b) is performed with providing water during the reaction, except for the water produced by the reaction during step (b), such that step (b) is performed in a wet slurry.

Also provided herein are systems capable of and configured to produce a cement material according to any method for producing a cement material disclosed herein or any combination of embodiments thereof disclosed herein. The systems disclosed herein for producing a cement material may include any conventional or art-known features or elements that may be needed, as recognized by one of ordinary skill in the art, to operate according to any method disclosed herein for producing a cement material.

In an aspect, a system for producing a cement material is configured to: react sulfur dioxide and water to form a first acid, the first acid comprising at least one sulfur-containing anion; react the first acid and a first cement precursor to form a second cement precursor; wherein the second cement precursor comprises the at least one sulfur-containing anion; and convert the second cement precursor to the cement material. In certain embodiments of the system for producing a cement material, the system comprises an electrochemical cell configured to (i) electrochemically oxidize the sulfur dioxide to the first acid in the presence of water and (ii) electrochemically form hydrogen gas via a reduction reaction, such that the electrochemical cell electrochemically produces the first acid and the hydrogen gas; wherein the first acid is sulfuric acid. In certain embodiments of the system for producing a cement material, the system comprises a heated vessel, wherein the system is configured to convert the second cement precursor to the cement material inside the heated vessel. In certain embodiments of the system for producing a cement material, step (b) includes a combination of a reaction according to formula FX2a and a reaction according to formula FX2b, where reaction according to FX2a is optionally substantially performed in a separate vessel or section from the reaction according to FX2b. Optionally, the reaction according to FX2a is optionally substantially performed in the same vessel as the reaction according to FX2b. In certain embodiments of the system for producing a cement material, step (b) includes a combination of a reaction according to formula FX6a and a reaction according to formula FX6b, where reaction according to FX6a is optionally substantially performed in a separate vessel or section from the reaction according to FX6b. Optionally, the reaction according to FX6a is optionally substantially performed in the same vessel as the reaction according to FX6b.

Also provided herein are methods and systems for producing a cement material according to any one or any combination of embodiments of the methods and/or system disclosed herein.

Without wishing to be "bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

STATEMENTS REGARDING CHEMICAL COMPOUNDS AND NOMENCLATURE

Figure 1:
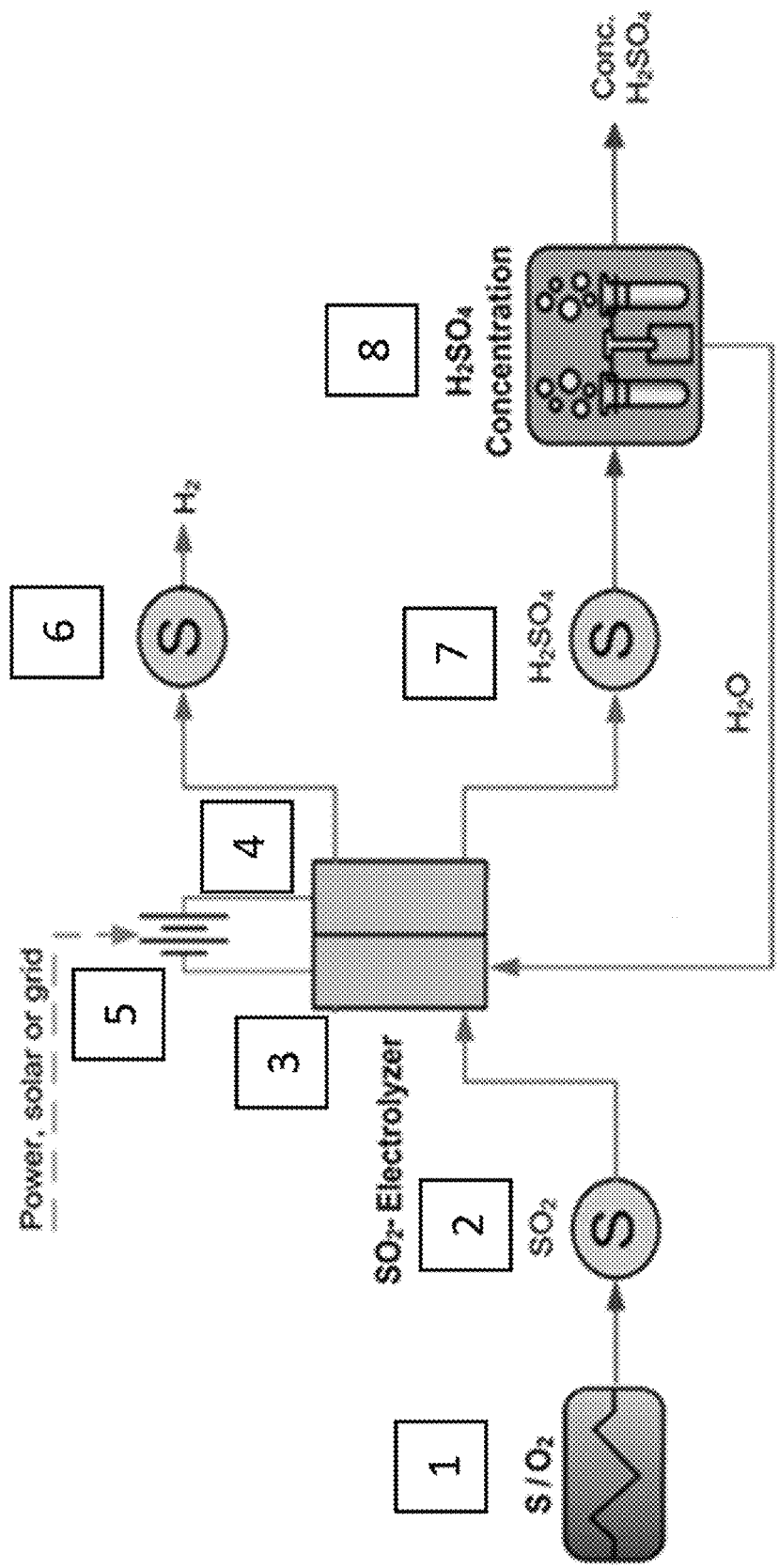
FIG. 1. A flow diagram of an exemplary method and system for producing sulfuric acid and hydrogen gas from sulfur species and water. Part 1: Reduced sulfur species are thermally oxidized to produce $SO_2$, such as via a sulfur burner. Part 2: $SO_2$ may be stored for immediate or future use. Part 3: $SO_2$ is then bubbled through the aqueous or sulfuric acid based electrolyte in an electrochemical cell and electrochemically converted into $H_2SO_4$ using an electrocatalyst at the anode. Part 4: Hydrogen is generated electrochemically at the cathode using an electrocatalyst. Part 5: The electrochemical reactor is powered from electricity generated from any source. If the electricity source is renewable then the process produces green hydrogen and sulfuric acid, free from $CO_2$ emissions. Part 6: Hydrogen may be sold, used to generate electricity, or stored for later use. If the hydrogen is oxidized with oxygen, the produced water may be used to replenish the electrolyte in the electrochemical reactor. Part 7: Sulfuric acid may be stored or Part 8: Sulfuric acid may be further concentrated before it is stored. If sulfuric acid is concentrated the resulting water may be used to replenish the aqueous electrolyte in the electrochemical reactor.
Figure 2:
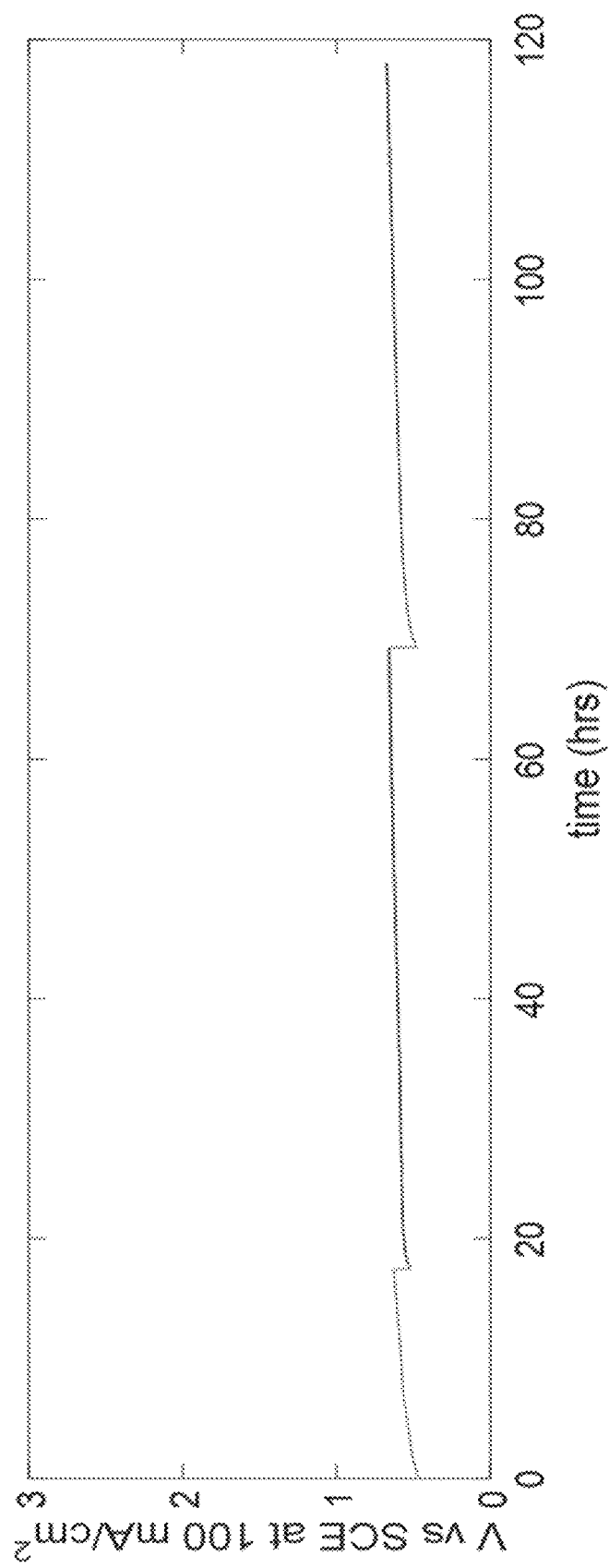
FIG. 2. Plot of voltage (V) vs. SCE at 100 $mA/cm^2$ corresponding to $SO_2$ oxidation versus time (hours). In an embodiment, $SO_2$ oxidation and coupled hydrogen production is demonstrated via a current density of 100 $mA/cm^2$ at around 500 mV vs SCE for almost 120 hours of initial operation. In contrast, similarly configured water splitting for example would need to reach potentials of over 1500 mV to reach 100 $mA/cm^2$.

In general, the terms and phrases used herein have their art-recognized meaning, which can be found by reference to standard texts, journal references and contexts known to those skilled in the art. The following definitions are provided to clarify their specific use in the context of the invention.

The terms "thermal conversion" and "thermally converting" refer to the conversion of a first chemical species to a second chemical species via a thermally-activated or thermally-driven process, which may also be referred to as a thermochemical process. An exemplary process for thermal conversion of a chemical species is burning, though thermal conversion processes are not necessarily limited thereto. For example, thermal conversion of sulfur to sulfur dioxide may include burning of the sulfur, such as via a sulfur burner system. Thermal oxidation of a species is a form of thermal conversion of the species. For example, thermal conversion of sulfur to sulfur dioxide may be referred to as thermal oxidation of the sulfur to sulfur dioxide. In some embodiments, thermal conversion may be aided by a catalyst. In some embodiments, thermal conversion does not require a catalyst or is performed without a catalyst. It should be noted that thermal oxidation and electrochemical oxidation are different processes, where thermal oxidation is driven or activated thermally (via heat or burning) and electrochemical oxidation is driven electrochemically (e.g., via applying or withdrawing electrical energy, optionally with the aid of an electrochemical catalyst).

The term "electrochemical cell" refers to devices and/or device components that convert chemical energy into electrical energy or electrical energy into chemical energy. Electrochemical cells have two or more electrodes (e.g., positive and negative electrodes; e.g., cathode and anode) and one or more electrolytes. An electrolyte may include species that are oxidized and species that are reduced during charging or discharging of the electrochemical cell. Reactions occurring at the electrode, such as sorption and desorption of a chemical species or such as an oxidation or reduction reaction, contribute to charge transfer processes in the electrochemical cell. Electrochemical cells include, but are not limited to, electrolytic cells such as electrolysers and fuel cells. Electrochemical oxidation may occur at the positive electrode, for example, and electrochemical reduction may occur at the negative electrode, for example. Electrochemical oxidation refers to a chemical oxidation reaction accompanied by a transfer of electrical energy (e.g., electrical energy input driving the oxidation reaction) occurring in the context an electrochemical cell. Similarly, electrochemical reduction refers to a chemical reduction reaction accompanied by a transfer of electrical energy occurring in the context an electrochemical cell. A chemical species electrochemically oxidized during charging, for example, may be electrochemically reduced during discharging, and vice versa. The term "electrochemically" or "electrochemical" may describe a reaction, process, or a step thereof, as part of which chemical energy is converted into electrical energy or electrical energy is converted into chemical energy. For example, a product may be electrochemically formed when electrical energy is provided to help the chemical conversion of a reactant(s) to the product proceed.

The term "elemental sulfur" refers to any one or combination of the allotropes of sulfur, such as, but not limited to, $S_7$, $S_8$, $S_6$, $S_{12}$, and $S_{18}$, and including crystalline, polycrystalline, and/or amorphous sulfur.

"RHE" refers to the reference electrode commonly referred to as the reversible hydrogen electrode. "SCE" refers to the reference electrode commonly referred to as the saturated calomel electrode.

The term "initial hours of operation" refers to the time during which the cell is operational starting from the very first/initial operation, or "turning on," of the cell. Time during which the cell or system is not being operated (i.e., no electrochemical reduction or oxidation occurring therein, or no electrical energy input or output is occurring) is not included in the initial hours of operation determination.

In some embodiments, the term "aqueous" refers to a solution where the solvent is water such that other species of the solution, or solutes, are substantially solvated by water. In some embodiments, the term "aqueous" may generally refer to a solution comprising water.

The term "amending agricultural water" refers to changing or adding something, such as a solute, to agricultural water. For example, acidification of agricultural water by the addition of sulfuric acid, such as a solution including sulfuric acid, to agricultural water. Agricultural water refers to water used for an agricultural purpose, such as irrigation. The term "amending soil" refers to changing or adding something to soil. For example, acidification of soil by the addition of sulfuric acid, such as a solution including sulfuric acid, to soil.

The term "cement" refers to hydraulic, non-hydraulic, or both hydraulic and non-hydraulic cement, including. An exemplary cement is, but is not limited to, Portland cement. Generally, a cement is a binder material, which, for example, may be mixed with fine aggregate particles (such as to produce mortar for masonry) or with sand and gravel (to produce concrete). According to certain embodiments, cement comprises calcium oxide. Cement may optionally further comprise one or more other materials including, but not limited to, certain silicate(s), $SiO_2$, certain oxide(s), $Fe_2O_3$, certain aluminate(s), $Al_2O_3$, belite, elite, tricalcium aluminate, brownmillerite, A "cement material" refers to a material that is a constituent of cement. For example, CaO is a cement material. A composite cement material may include a plurality of cement materials, such as Portland cement, and/or a cement material and one or more other additive(s) that are not cement materials.

The term "substantially" refers to a property or condition that is within 20%, within 10%, within 5%, within 1%, or is equivalent to a reference property or condition. The term "substantially equal," "substantially equivalent," or "substantially unchanged," when used in conjunction with a reference value describing a property or condition, refers to a value or condition that is within 20%, within 10%, within 5%, within 1%, within 0.1%, or optionally is equivalent to the provided reference value or condition. For example, a voltage that is substantially 500 mV (or, substantially equivalent to 500 mV) is within 20%, within 10%, within 5%, within 1%, or equal to 500 mV. The term "substantially greater," when used in conjunction with a reference value or condition describing a property or condition, refers to a value that is at least 2%, at least 5%, at least 10%, or at least 20% greater than the provided reference value or condition. For example, a voltage is substantially greater than 500 mV if the voltage is at least 20% greater than, at least 10% greater than, at least 5% greater than, or at least 1% greater than 500 mV. The term "substantially less," when used in conjunction with a reference value or condition describing a property or condition, refers to a value or condition that is at least 2%, at least 5%, at least 10%, or at least 20% less than the provided reference value. For example, a voltage is substantially less than 500 mV if the voltage is at least 20% less than, at least 10% less than, at least 5% less than, or at least 1% less than 500 mV.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

U.S. Provisional Patent Application No. 62/673,707, filed May 18, 2018, U.S. Provisional Patent Application No. 62/726,858, filed Sep. 4, 2018, and U.S. Provisional Patent Application No. 62/743,652, filed Oct. 10, 2018, are all hereby incorporated by reference in their entirety to the extent not inconsistent herewith.

Disclosed herein are method and systems for converting water and any sulfur species that is more reduced than sulfuric acid ($H_2SO_4$) (e.g. hydrogen sulfide ($H_2S$), elemental sulfur (e.g., S), thiols (R—SH), sulfur dioxide ($SO_2$), etc.) to hydrogen gas and $H_2SO_4$.

Some embodiments of the methods and systems may be described as follows. First, the reduced sulfur species is oxidized (e.g. burned in air) to produce $SO_2$, optionally via a sulfur burner, and the sulfur dioxide is then captured and may be stored. The $SO_2$ serves as an input to an electrochemical process where the sulfur dioxide is introduced, such as via bubbling through an aqueous electrolyte, and the sulfur dioxide is then electrochemically converted into $H_2SO_4$ at the anode and hydrogen ($H_2$) at the cathode using any power source, including distributed power created onsite or power sourced from the grid. For example, the power source may be a photovoltaic system. The produced $H_2$ gas produced can then be captured and can be stored for future use or can be oxidized directly in a hydrogen fuel cell as a source of reliable electricity or in a furnace as a source of reliable heat, which can optionally be used directly for concentrating sulfuric acid, could be turned into electricity using a steam turbine, or could be captured and used in another process that requires hydrogen gas (e.g. alkylation in oil refineries, or ammonia production via the Haber-Bosch process). Hydrogen is a versatile clean-burning chemical that can be oxidized for energy generation where the only byproduct is water. Therefore a process that uses energy and sulfuric acid, or anywhere that sulfuric acid is used (or could be used) and energy (heat, electricity, or other) could be sold, could benefit from this synergy. The $H_2SO_4$ can be stored directly for later use or first concentrated and then stored for later use. If the sulfuric acid is concentrated before storage, the water that results from the purification or oxidation of hydrogen steps can be reused as part of the aqueous electrolyte. A flow diagram of the process and system, according to certain embodiments, is shown in FIG. 1.

In some embodiments, the methods and systems disclosed herein directly produce highly concentrated sulfuric acid. For example, the sulfuric acid produced by the methods and systems disclosed herein, such as sulfuric acid output of the methods or systems, is highly concentrated (e.g., greater than or equal to 80%, or greater than or equal to 89%, or greater than or equal to 93%, or substantially 98%), optionally without requiring a separate concentration step or a concentrator. In some embodiments, the solution in which electrochemical production of sulfuric acid and hydrogen gas is occurring is characterized by a bulk concentration of sulfuric acid that is greater than 0% by mass to less than or substantially equal to 98% by mass, or optionally any concentration therebetween. In some embodiments, for example, the sulfuric acid is not combined with oleum, such as oleum produced via the contact process. In some embodiments, the electrochemically produced sulfuric acid is diluted, such as to a concentration selected from the range of 1% to 10%, for example for agricultural applications.

The methods and systems disclosed herein can provide lower energy consumption, low $CO_2$ production hydrogen and sulfuric acid for industrial as well as fuel and energy storage needs, compared to certain conventional approaches. Hydrogen and sulfuric acid are used industrially in diverse ways, and in many cases are both used in the same process.

The methods and systems disclosed herein can be most useful where both hydrogen and sulfuric acid are used. For example, in fertilizer production, sulfuric acid is used to protonate phosphate rock to make bioavailable phosphoric acid. Hydrogen is used in the fertilizer industry in the Haber-Bosch process to thermochemically make ammonia. Ammonia and phosphoric acid are then combined to make ammonium phosphate fertilizer. Ammonia and sulfuric acid can be directly combined to make ammonium sulfate fertilizer. Currently in fertilizer production, hydrogen is made by steam methane reforming and sulfuric acid is made by the contact process. Because the methods and systems disclosed herein include a single process instead of two processes to make both products, they can to save industries an enormous amount of capital expenditure.

Both sulfuric acid and hydrogen gas are also used in oil refining where sulfuric acid is used as a catalyst for alkylation and hydrogen is used as a reducing agent to remove sulfur containing compounds from oil and gas in order to produce organic fuels and organic feedstocks for alkylation and other uses. By combining hydrogen and sulfuric acid production, the methods and systems disclosed herein can save oil and gas companies large amounts of money.

Agricultural industries can use either one or both of sulfuric acid and hydrogen. Sulfuric acid can be used to acidify irrigation water and hydrogen can be used as a clean burning fuel for transportation or electricity generation. Currently farmers either buy sulfuric acid that is produced via the contact process to acidify irrigation water or they buy conventional sulfur burners which burn sulfur to produce $SO_2$ which is then injected into water to produce sulfurous acid ($H_2SO_3$). In contrast, the methods and systems disclosed herein can generate sulfuric acid (a stronger acid than sulfurous acid) on-site and on-demand as well as generate hydrogen which can be used as a fuel in vehicles or burned for electricity to power other farm equipment. The methods and systems disclosed herein can be configured at a small scale, or whatever scale is appropriate, to meet the size and needs to any farm. The methods and systems disclosed herein can provide on-demand sulfuric acid and hydrogen gas because the processes can be reliably turned-off and turned-on as needed. In some embodiments, the methods and systems disclosed herein can provide on-demand sulfuric acid and hydrogen gas at least because the processes can be reliably turned-off within a time period of 1 hour and turned-on within a time period of 1 hour. This feature obviates the need for large, dangerous, and expensive sulfuric acid storage tanks, for example, which could be an undesired liability for farms, especially small farms.

The relevant chemical reactions in the methods and systems disclosed herein include: (i) Thermal Oxidation: $SR+O_2 \rightarrow SO_2$ (SR is any sulfur species that is more reduced than $SO_2$, e.g. HS, $H_2S$, DMS, DMDS, S, $S_8$); (ii) Electrochemical Oxidation: $SO_2+2H_2O \rightarrow H_2SO_4+2H^++2e^-$; and (iii) Electrochemical Reduction: $2e^-+2H^+ \rightarrow H_2$; yielding a net reaction of (iv) $S+O_2+2H_2O \rightarrow H_2SO_4+H_2$.

The thermal conversion of a sulfur-containing species to sulfur dioxide can be performed without a catalyst. The electrochemical production of sulfuric acid and hydrogen gas can be performed with a catalyst. An exemplary catalyst for the electrochemical processes is, but is not limited to, platinum. Advantages of platinum as a catalyst include needing a very low applied potential relative to other electrochemical hydrogen generating processes (i.e. water splitting).

Figure 3:
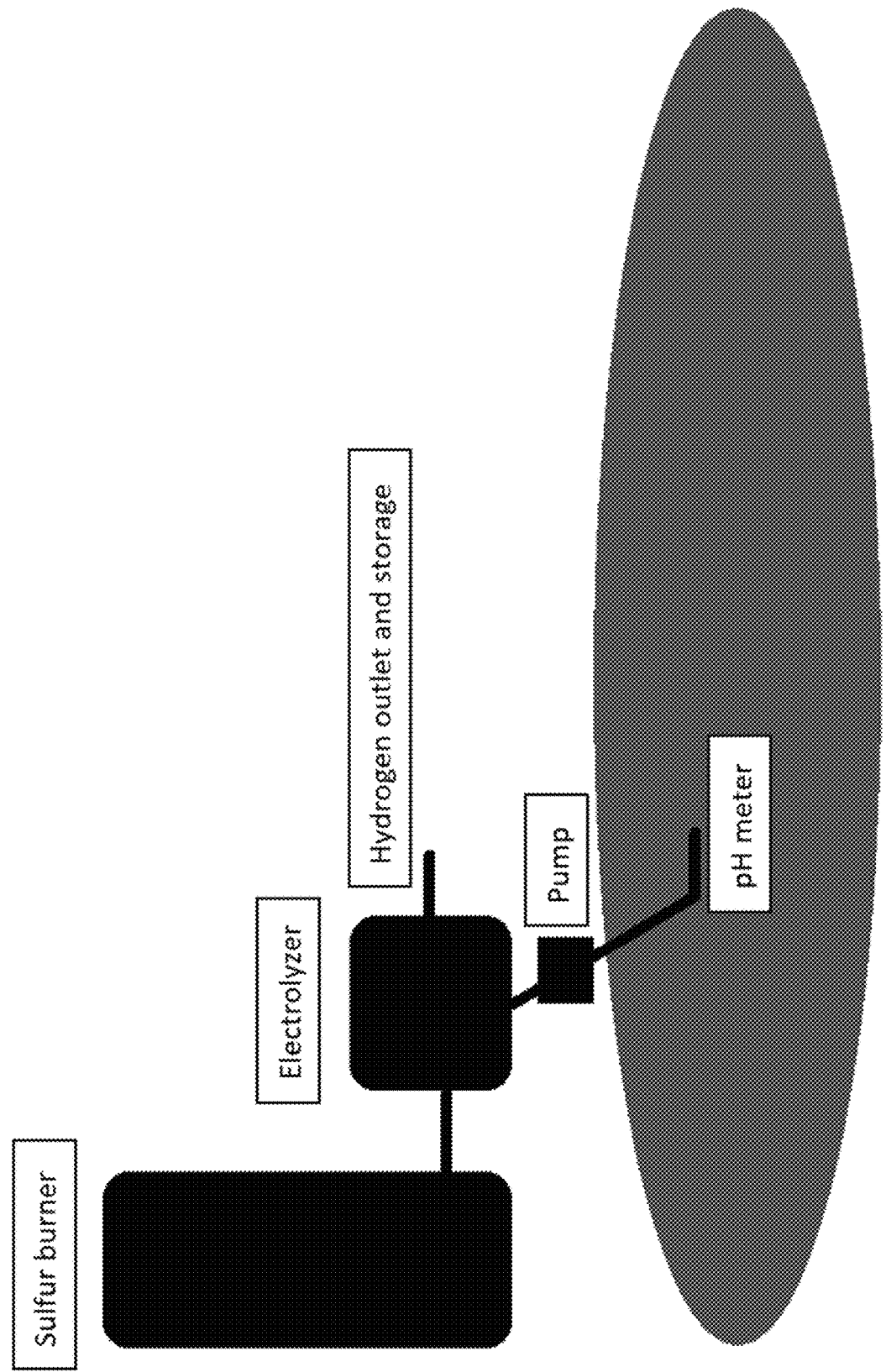
FIG. 3. Diagram of an electrochemical sulfuric acid generating system, according to certain embodiments, for soil acidification. This exemplary system combines a sulfur burner with an electrochemical cell system (e.g., electrolyser) to make sulfuric acid and then uses pH sensors and pumps to mix the sulfuric acid with water to obtain an appropriate pH.
Figure 4:
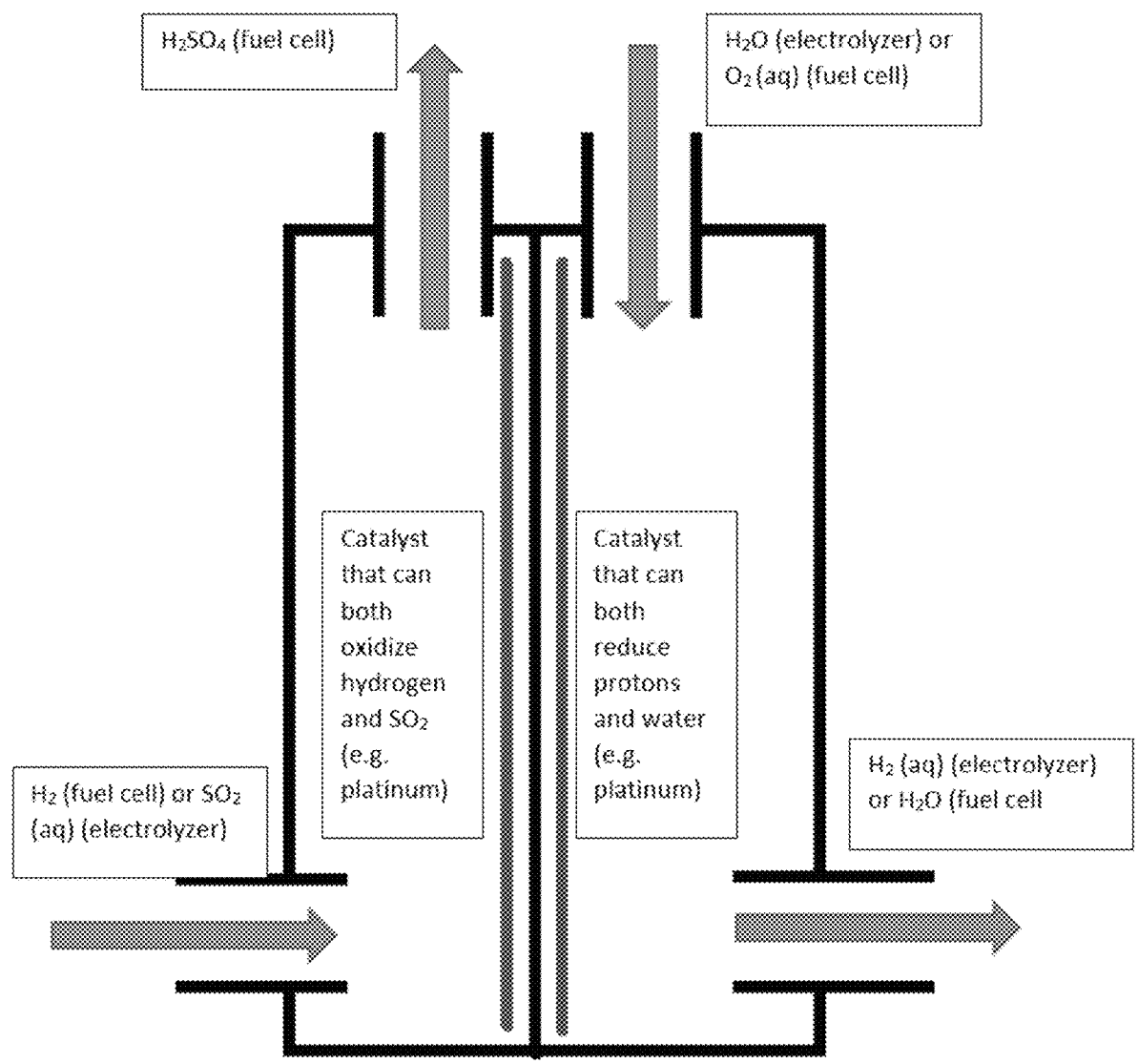
FIG. 4. Diagram an electrochemical cell, according to certain embodiments, that can generate sulfuric acid from SO$_2$ at the anode and hydrogen gas at the cathode and also can be used as a fuel cell to oxidize hydrogen with oxygen to make water.
Figure 5A:
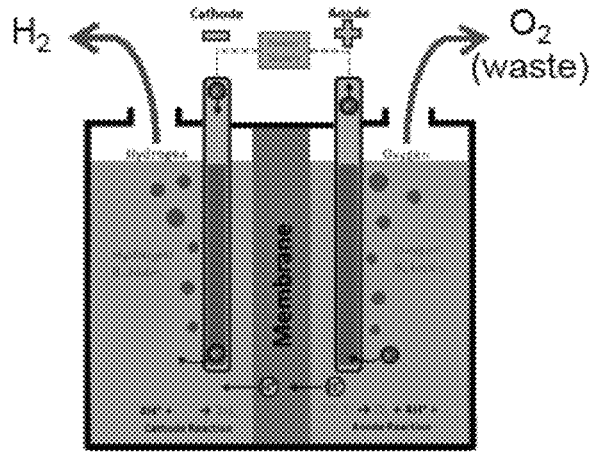
FIG. 5A. A schematic corresponding to conventional water electrolysis.
Figure 5B:
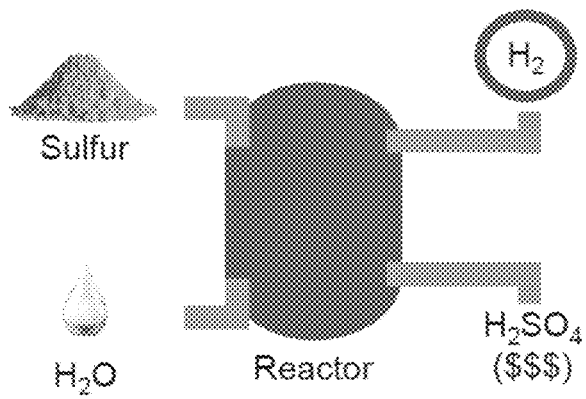
FIG. 5B: a schematic illustrating the method and systems disclosed herein, in an embodiment.
Figures 6, 7:
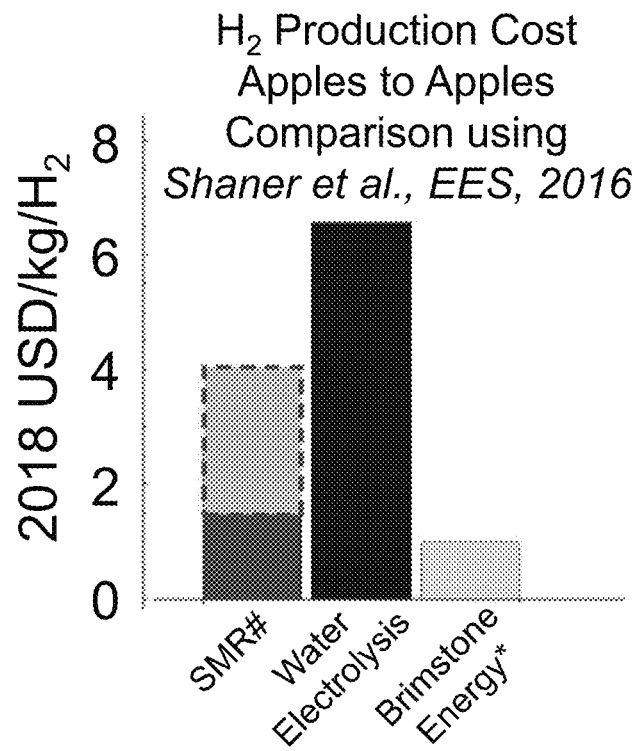
FIG. 6. A table comparing a variety of approaches for hydrogen gas production. "Grid Brimstone" refers to methods and systems disclosed herein, according to certain embodiments, with energy is provided from the grid. "Solar-only Brimstone" refers to methods and systems disclosed herein, according to certain embodiments, with energy is provided from photovoltaic systems. "SMR" refers to conventional steam methane reforming.
FIG. 7. A bar graph comparing cost of hydrogen gas produced by various methods. "Brimstone energy" refers to methods and systems disclosed herein, according to certain embodiments. "SMR" refers to conventional steam methane reforming.
Figure 8:
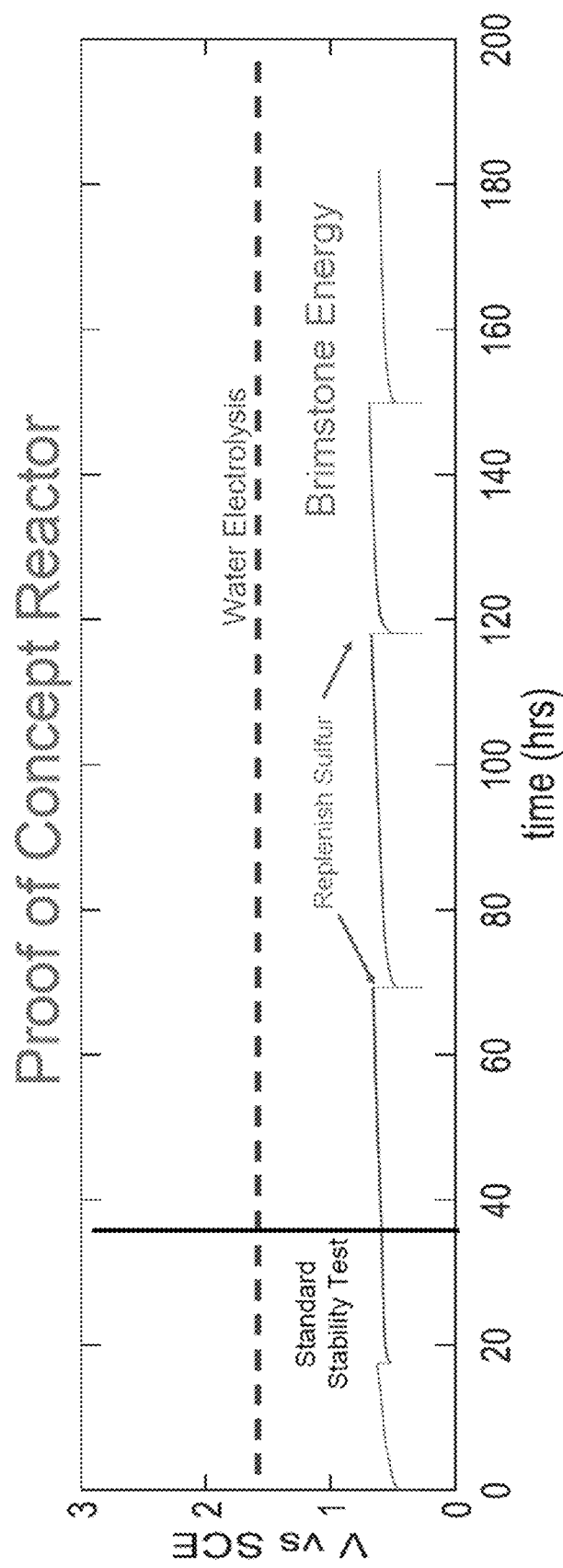
FIG. 8. Plot of voltage (V) vs. SCE at 100 mA/cm$^2$ corresponding to SO$_2$ oxidation versus time (hours). In an embodiment, SO$_2$ oxidation and coupled hydrogen production is demonstrated via a current density of 100 mA/cm$^2$ at around 500 mV vs SCE for at least 180 hours of initial operation.
Figure 9:
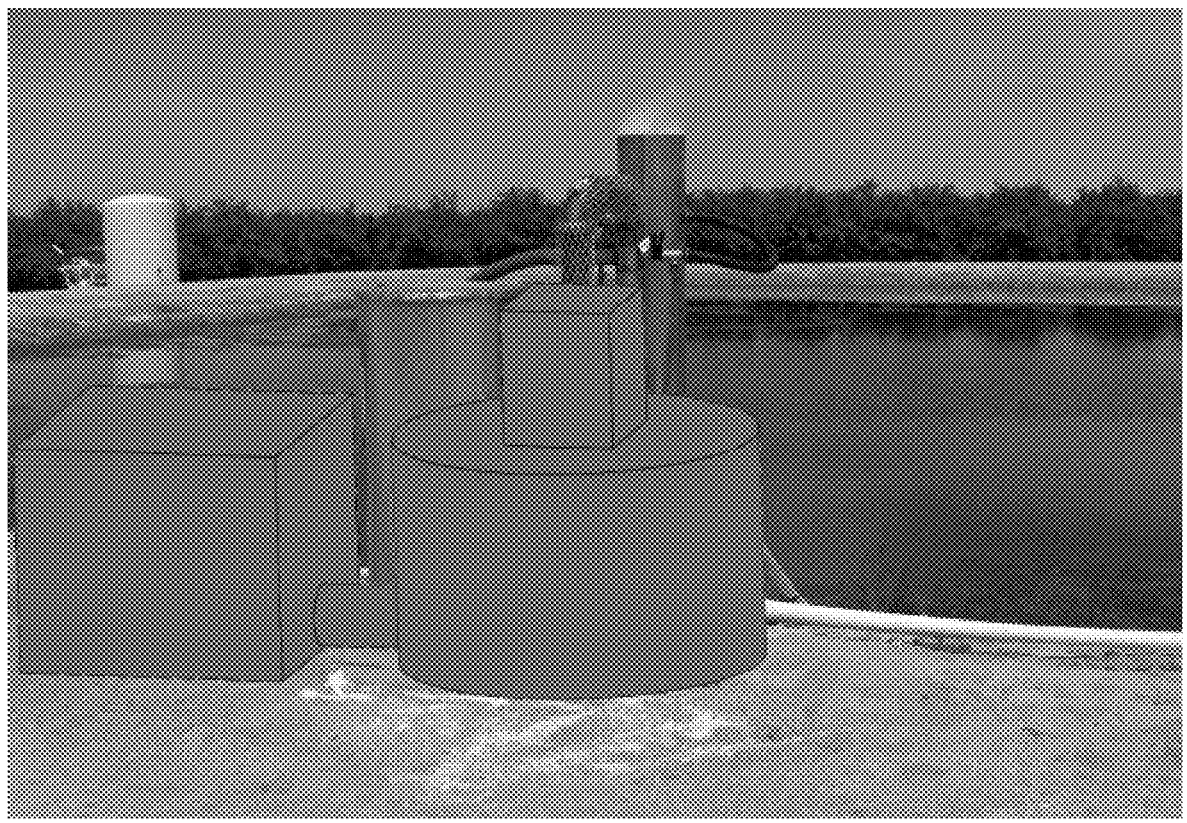
FIG. 9. A system according to certain embodiments disclosed herein, which is configured to soil or agricultural water acidification.
Figure 10:
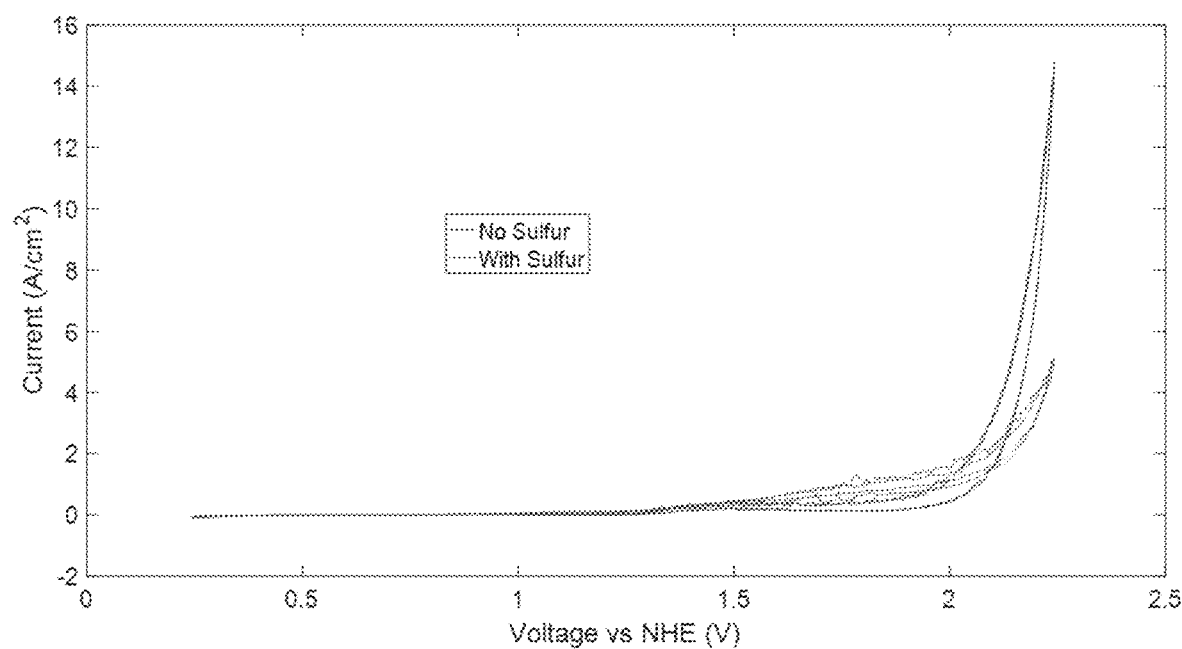
FIG. 10. Plot showing current-voltage (CV) characteristics of 60% H$_2$SO$_4$ and 40% H$_2$O at 130° C. (blue) and 60% H$_2$SO$_4$ and 40% H$_2$O plus molten sulfur at 130° C.
Figure 11:
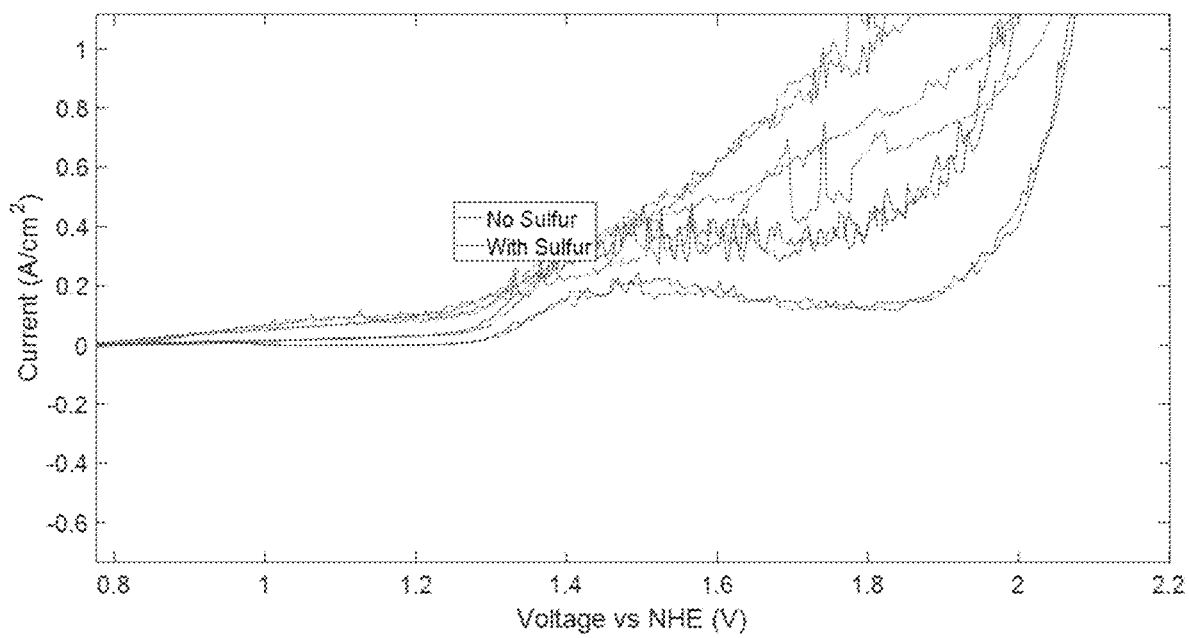
FIG. 11. A zoom in of a CV curve of 60% H$_2$SO$_4$ and 40% H$_2$O at 130° C. (blue) and 60% H$_2$SO$_4$ and 40% H$_2$O plus molten sulfur at 130° C. Note that significant current is observed below 1.23 V vs NHE for the reaction with sulfur present (orange) however no current is observed for the reaction without sulfur until above 1.23 V (blue).
Figure 12:
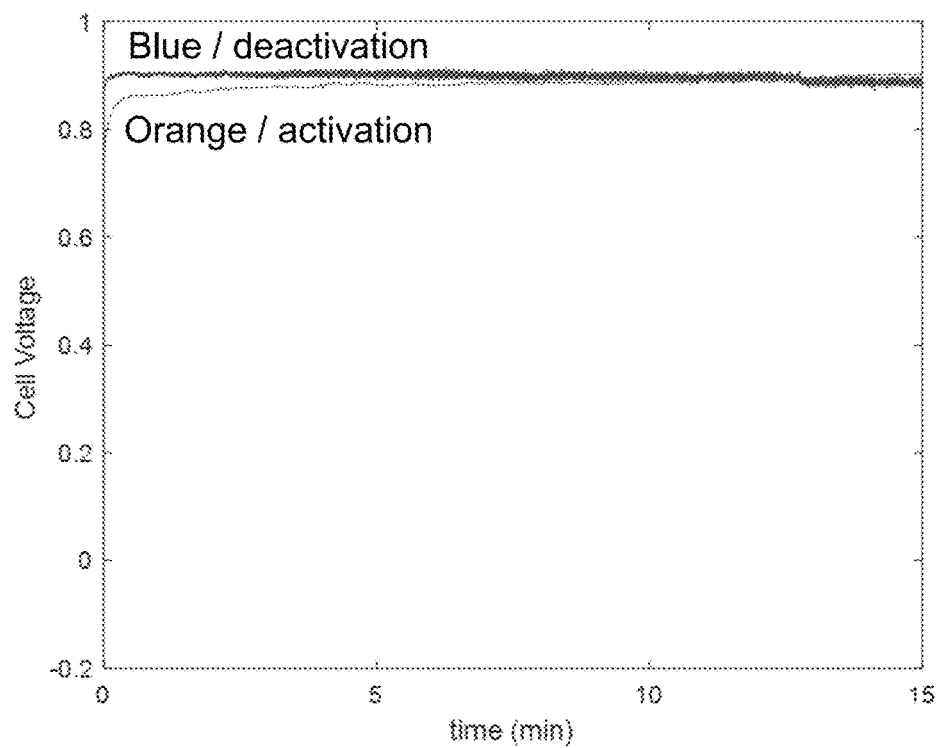
FIG. 12. Cell voltage at 1 A/cm$^2$ current density in saturated SO$_2$ before Pt catalyst deactivation (blue, top) and after Pt catalyst activation (orange, bottom)), corresponding to certain methods and systems for producing sulfuric acid and hydrogen gas, such as those including providing sulfur dioxide.
Figure 13:
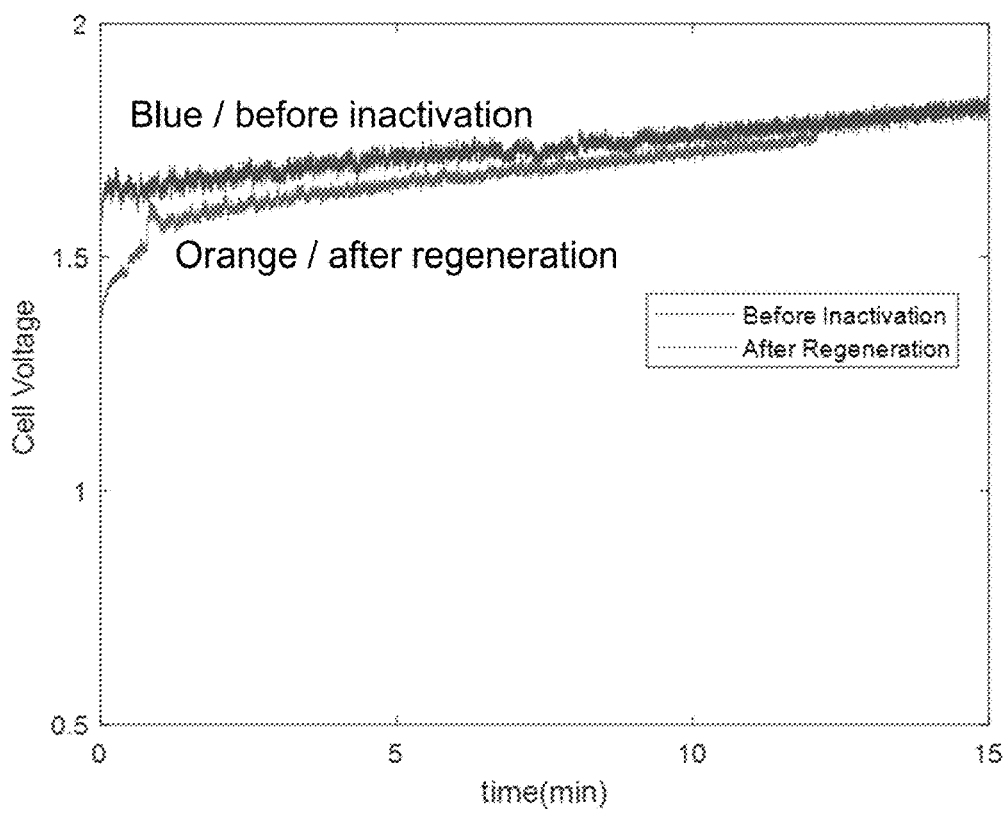
FIG. 13. Pt/Ti catalyst: the blue (top) line shows the Pt/Ti catalyst at 1 A/cm$^2$. Subsequently the catalyst is completely inactivated by dipping it in molten sulfur and letting the sulfur coat the catalyst. Subsequently the catalyst is regenerated by burning the sulfur off and repeating the method with the catalyst, showing that it had the same activity. These results correspond to certain methods and systems for producing sulfuric acid and hydrogen gas, such as those including providing sulfur dioxide.
Figure 14:
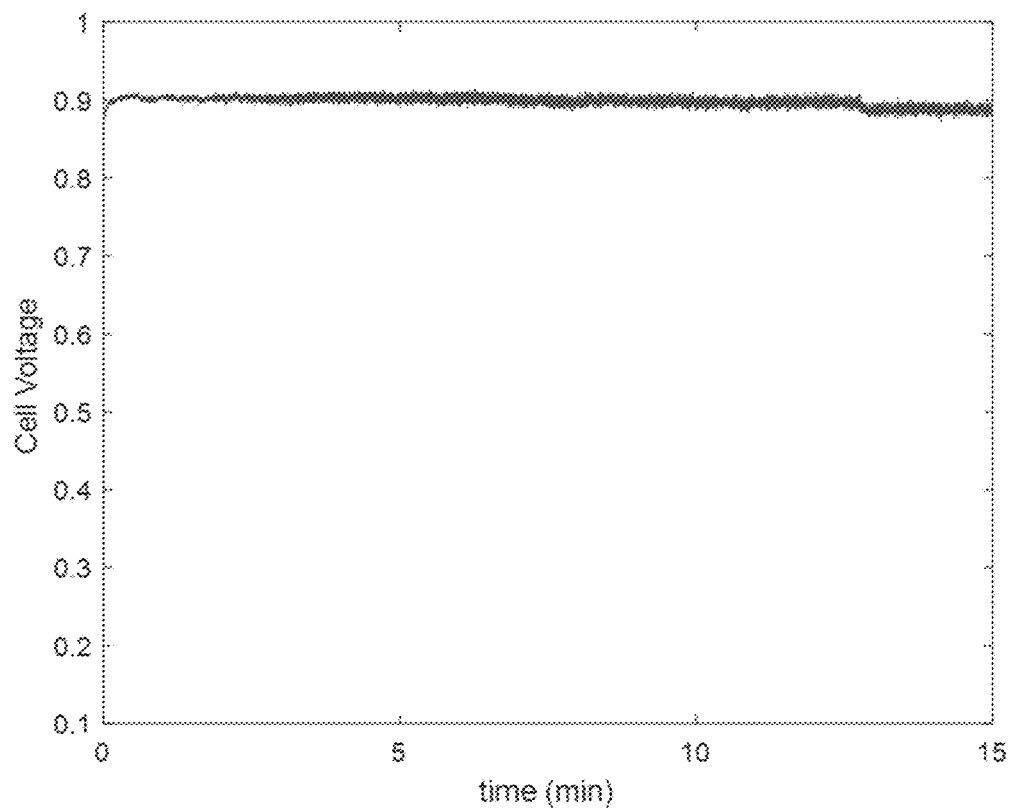
FIG. 14. Plot showing voltage vs time corresponding to 1 A/cm$^2$ Pt mesh catalyst under saturated SO$_2$ conditons, corresponding to certain methods and systems for producing sulfuric acid and hydrogen gas, such as those including a step of providing sulfur dioxide.
Figure 15:
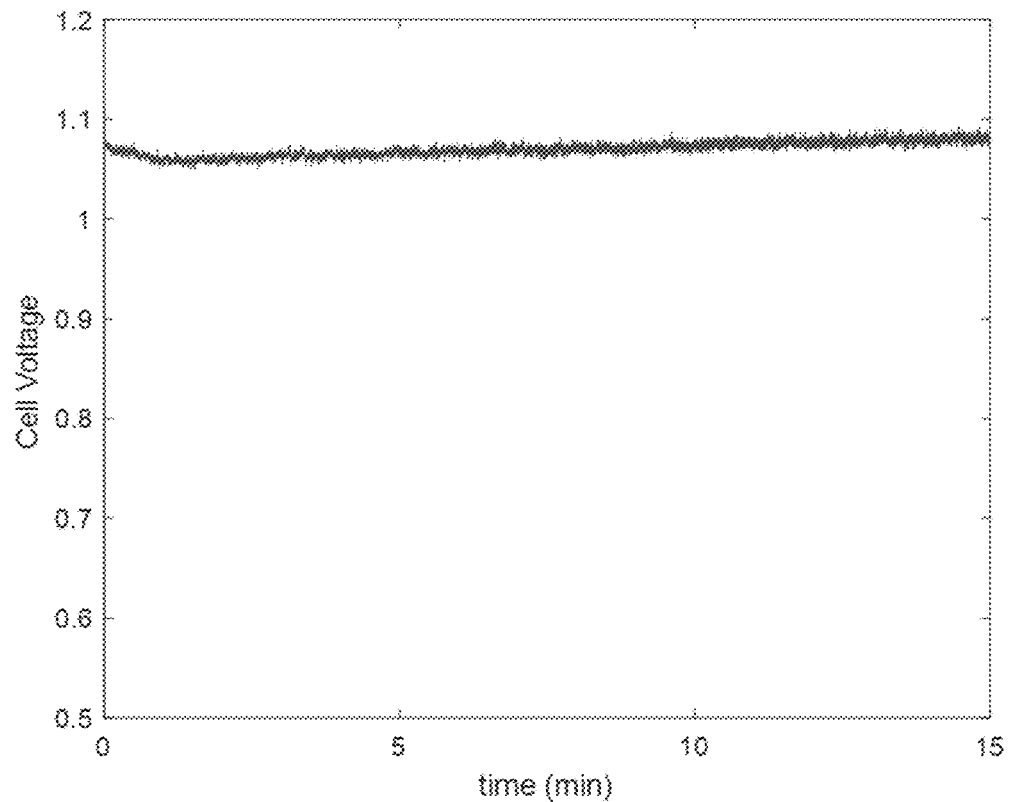
FIG. 15. Plot showing voltage vs time corresponding to 3 A/cm$^2$ Pt mesh catalyst, under saturated SO$_2$ conditions, corresponding to certain methods and systems for producing sulfuric acid and hydrogen gas, such as those including a step of providing sulfur dioxide.
Figure 16:
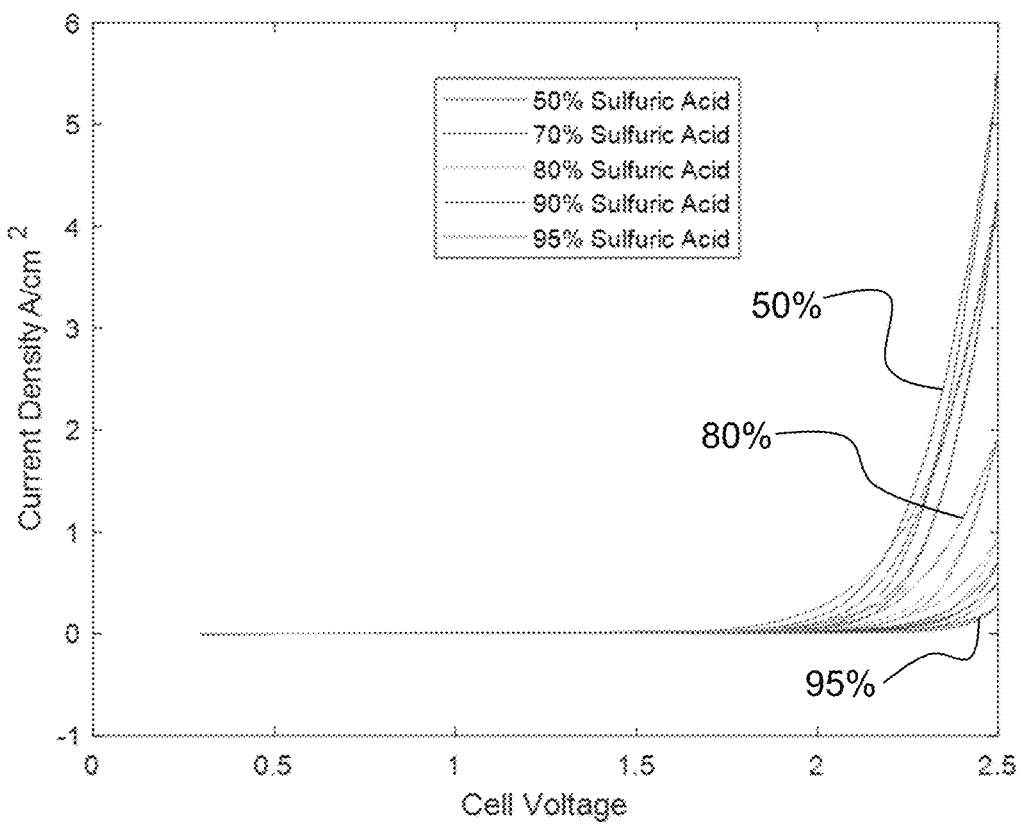
FIG. 16. Plot showing Current-voltage characteristics at different sulfuric acid concentrations under saturated SO$_2$ conditions, corresponding to certain methods and systems for producing sulfuric acid and hydrogen gas, such as those including a step of providing sulfur dioxide.
Figure 17:
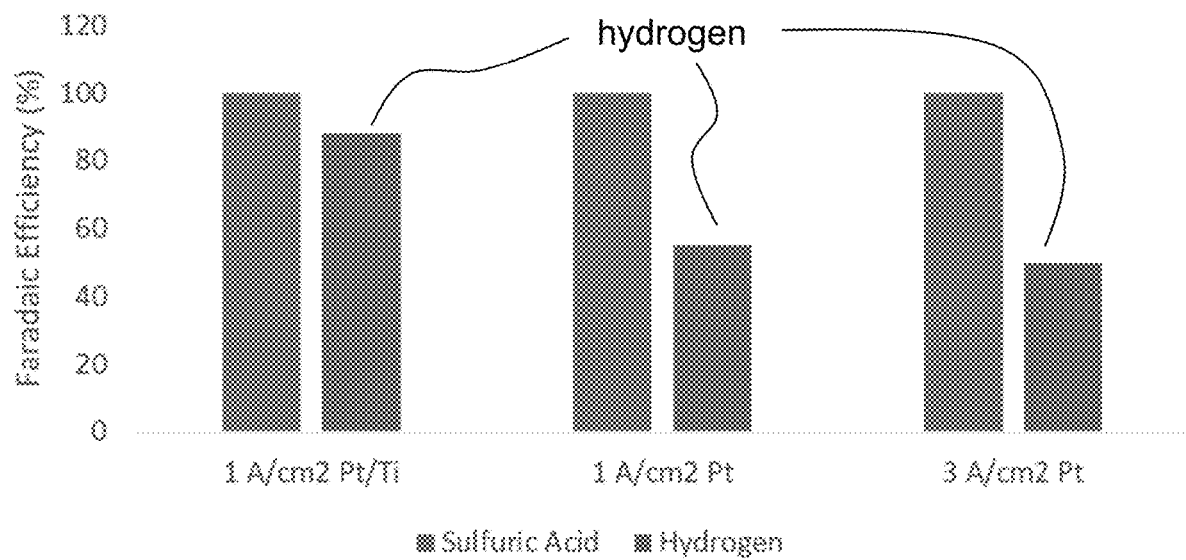
FIG. 17. Faradaic efficiencies for hydrogen (red, right bars, measured by volume) and sulfuric acid (blue, left bars, measured by Ion Chromotography), corresponding to certain methods and systems for producing sulfuric acid and hydrogen gas, such as those including a step of providing sulfur dioxide.
Figure 18:
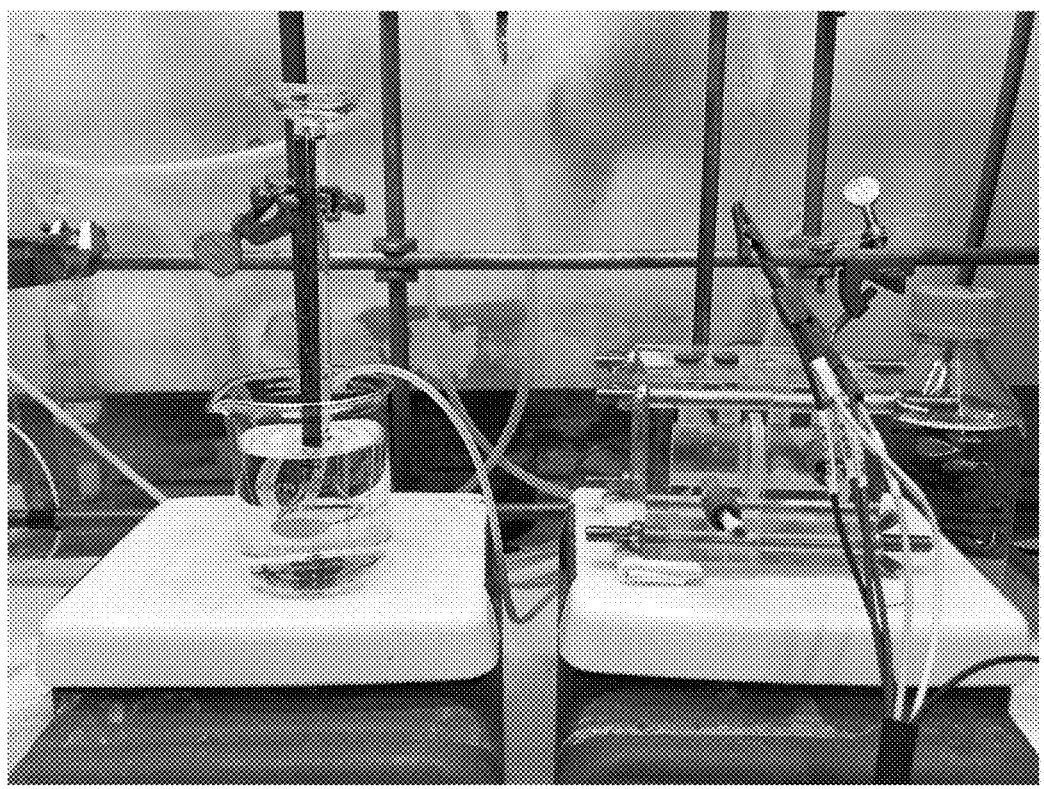
FIG. 18. A picture of the SO$_2$ reaction vessel with H$_2$ capture cylinder on the left, corresponding to certain methods and systems for producing sulfuric acid and hydrogen gas, such as those including a step of providing sulfur dioxide.
Figure 19:
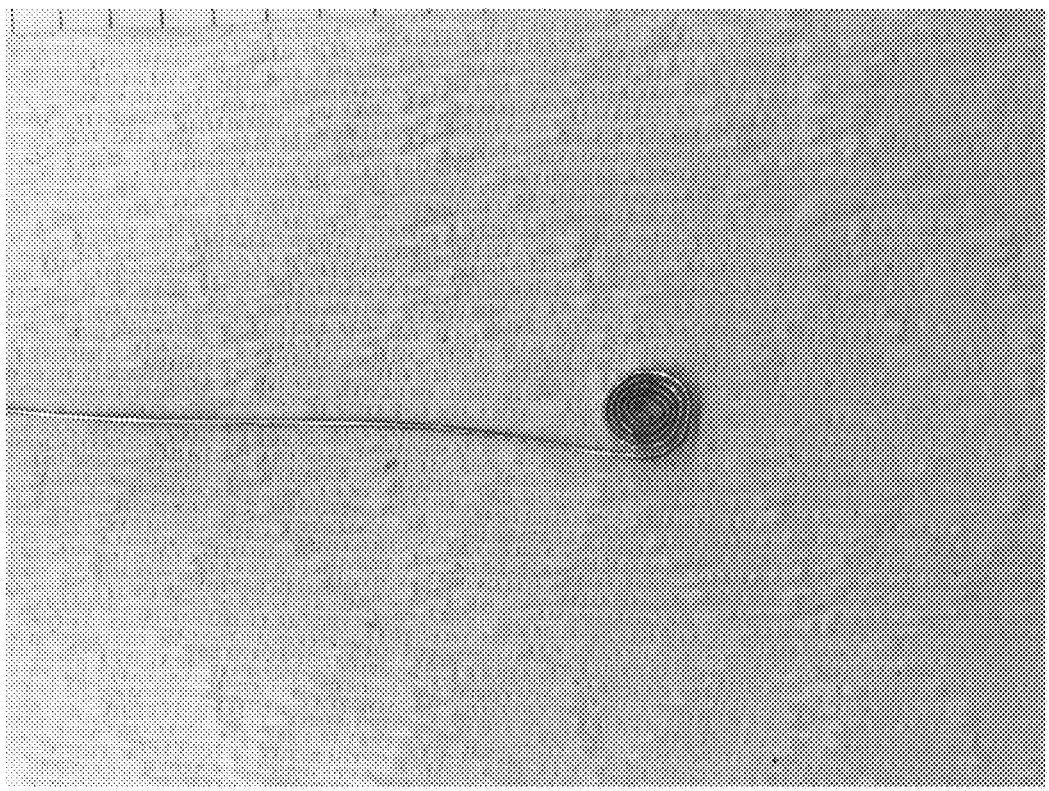
FIG. 19. Pt wire catalyst after regeneration, corresponding to certain methods and systems for producing sulfuric acid and hydrogen gas, such as those including a step of providing sulfur dioxide.
Figure 20:
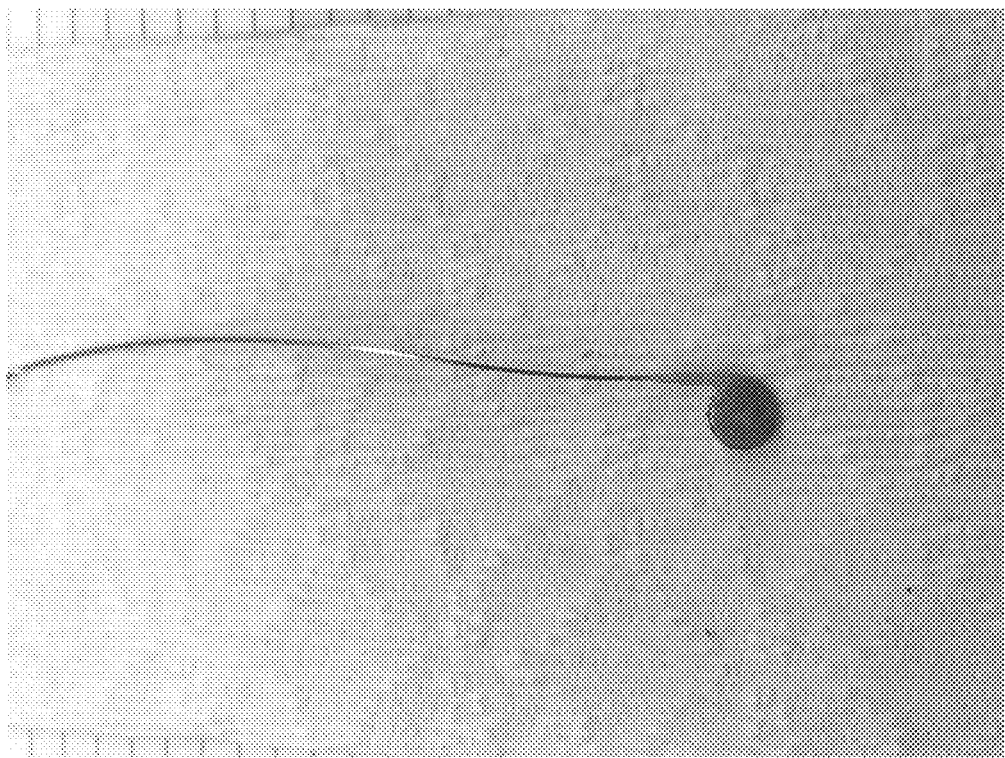
FIG. 20. Pt wire catalyst after deactivation, corresponding to certain methods and systems for producing sulfuric acid and hydrogen gas, such as those including a step of providing sulfur dioxide.
Figure 21:
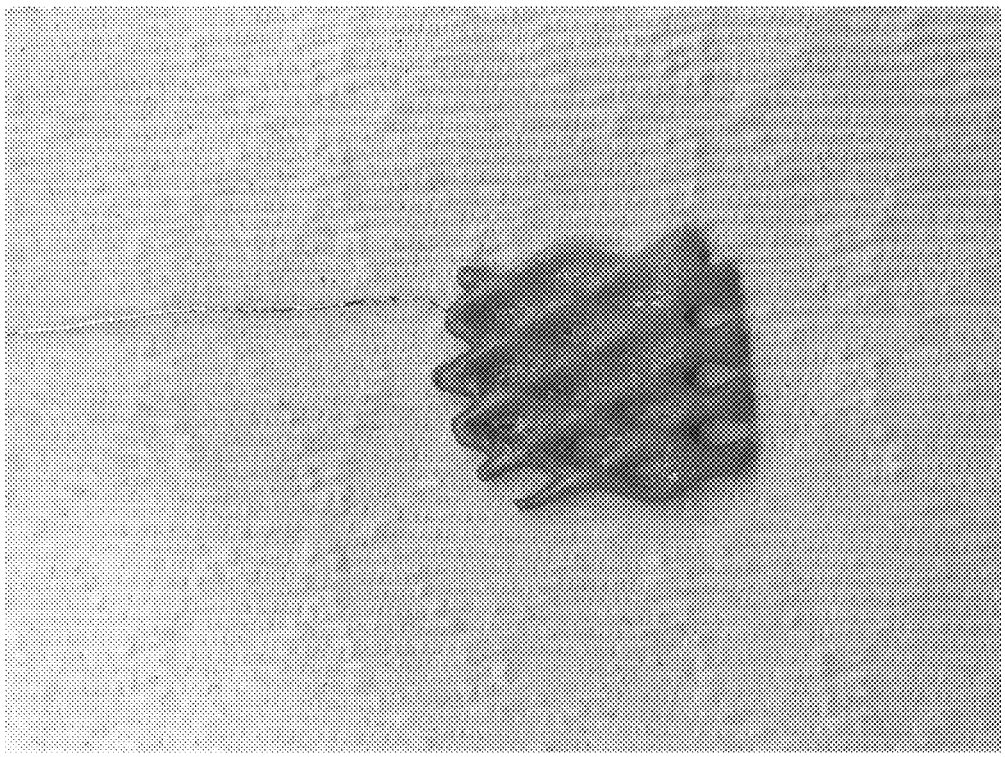
FIG. 21. Platinized titanium catalyst after deactivation, corresponding to certain methods and systems for producing sulfuric acid and hydrogen gas, such as those including a step of providing sulfur dioxide.
Figure 22:
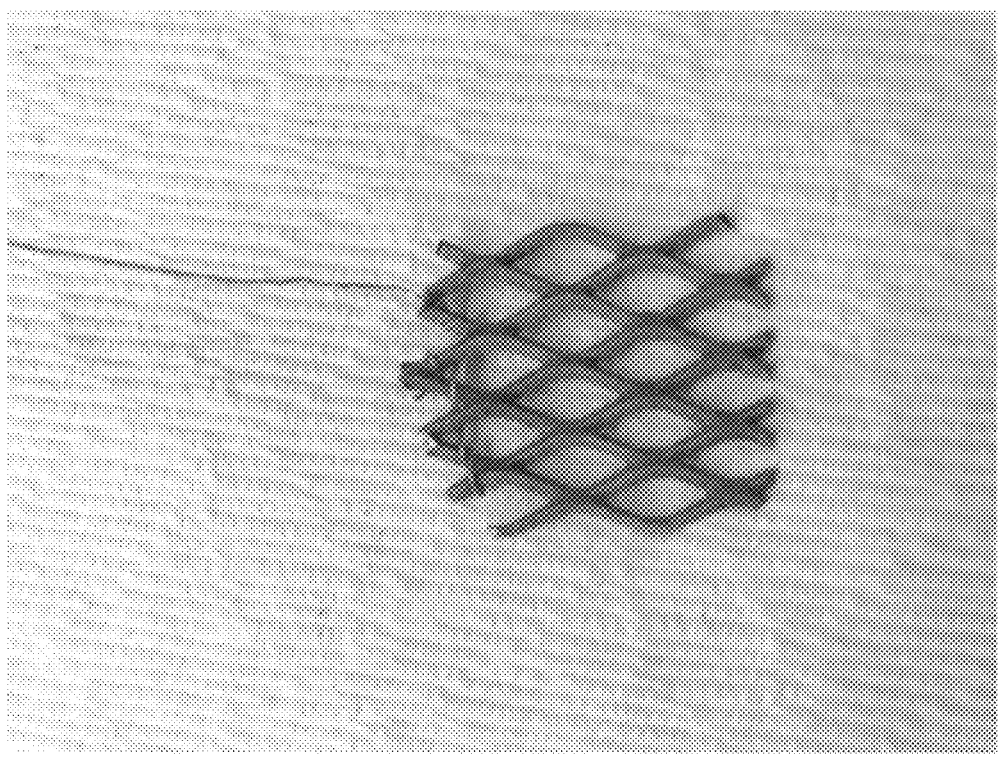
FIG. 22. Platinized titanium catalyst after regeneration, corresponding to certain methods and systems for producing sulfuric acid and hydrogen gas, such as those including a step of providing sulfur dioxide.
Figure 23:
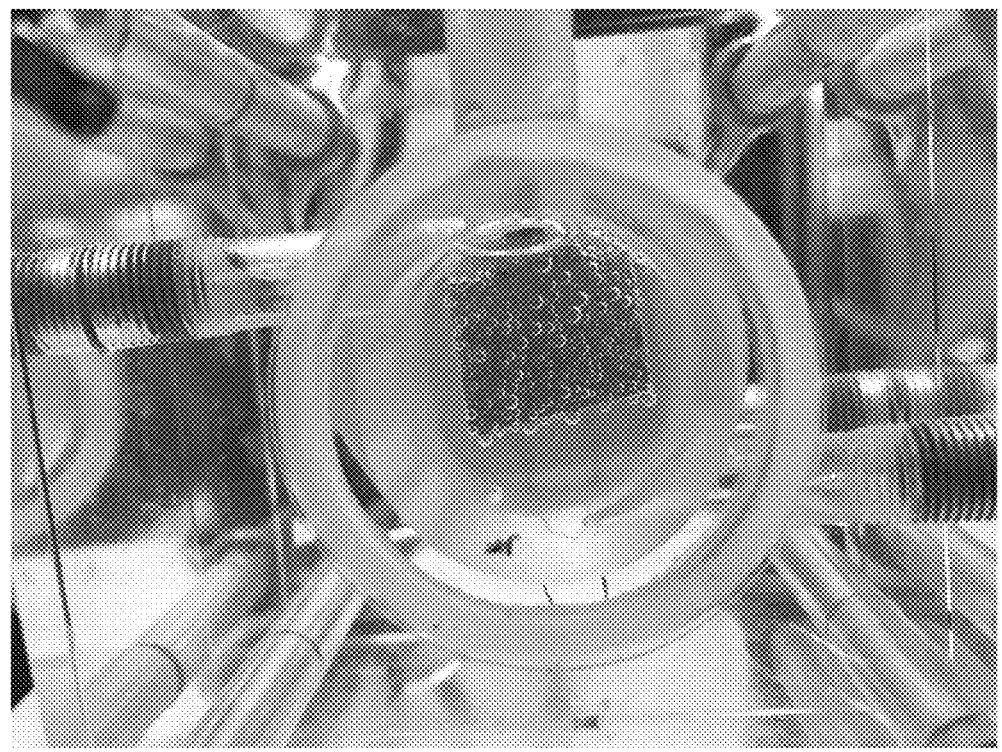
FIG. 23. Hydrogen bubbling off of the cathode during electrochemistry using a Ti cathode, corresponding to certain methods and systems for producing sulfuric acid and hydrogen gas, such as those including a step of providing sulfur dioxide.
Figure 24:
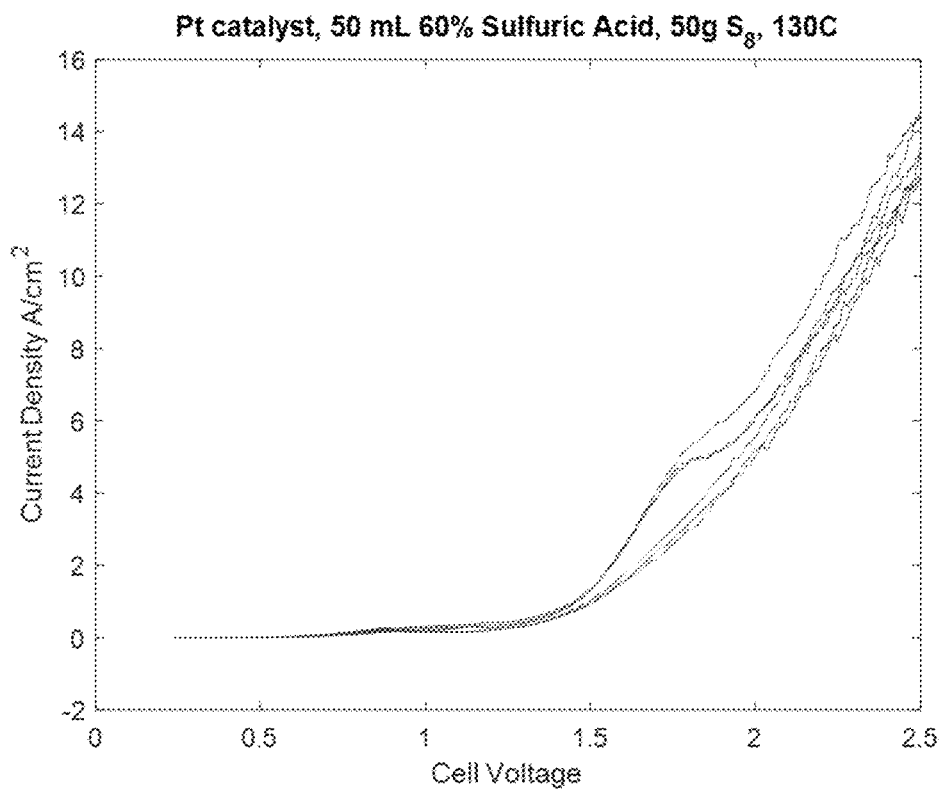
FIG. 24. Plot showing Current Density 50 mL 60% Sulfuric acid with 50 g of sulfur at 130° C. We were able to reach over 10 A/cm$^2$ current density at these elevated temperatures, corresponding to certain methods and systems for producing sulfuric acid and hydrogen gas, such as those including a step of providing sulfur dioxide.
Figure 25:
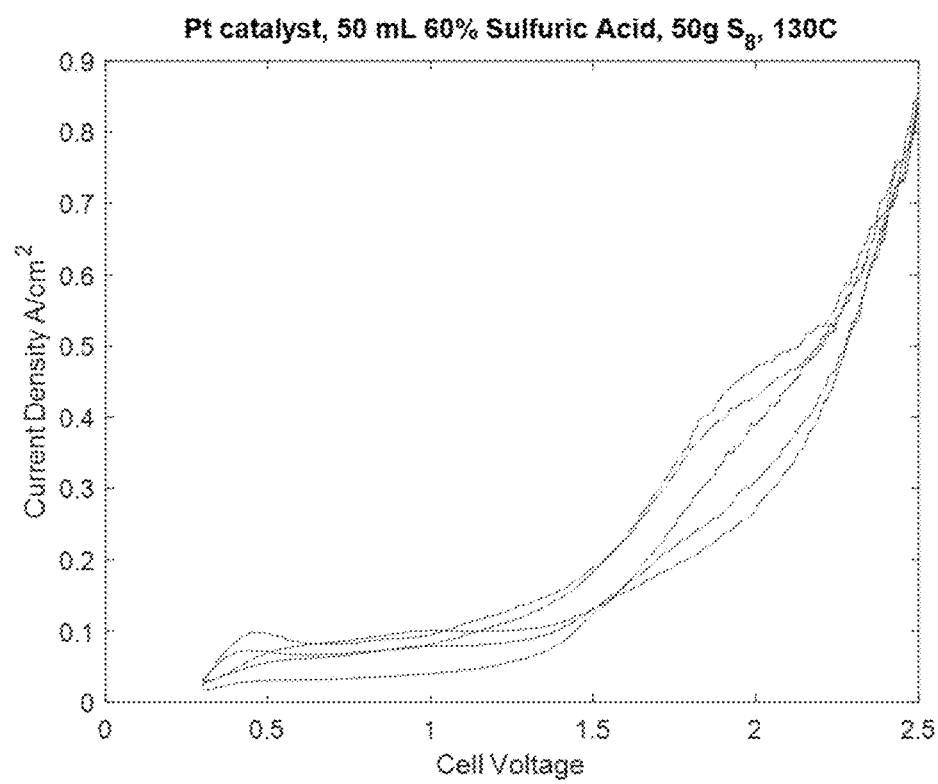
FIG. 25. Plot showing Current Density 50 mL 60% Sulfuric acid with 50 g of sulfur at 130 C. We were able to reach nearly 1 A/cm$^2$ current density at with much less Pt loading.
Figure 26:
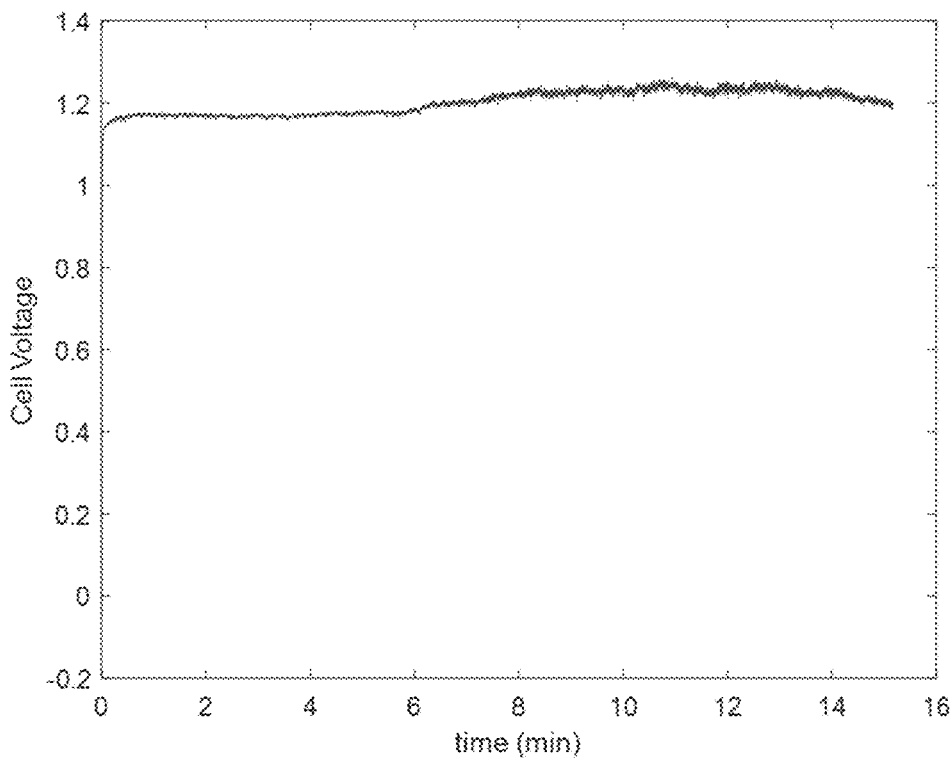
FIG. 26. Plot showing voltage to reach 1 A/cm$^2$ for 15 minutes. As the concentration of sulfuric acid increases, the voltage required increases. These results correspond to certain methods and systems for producing sulfuric acid and hydrogen gas, such as those including a mixture of sulfur material, supporting acid, and water.
Figure 27:
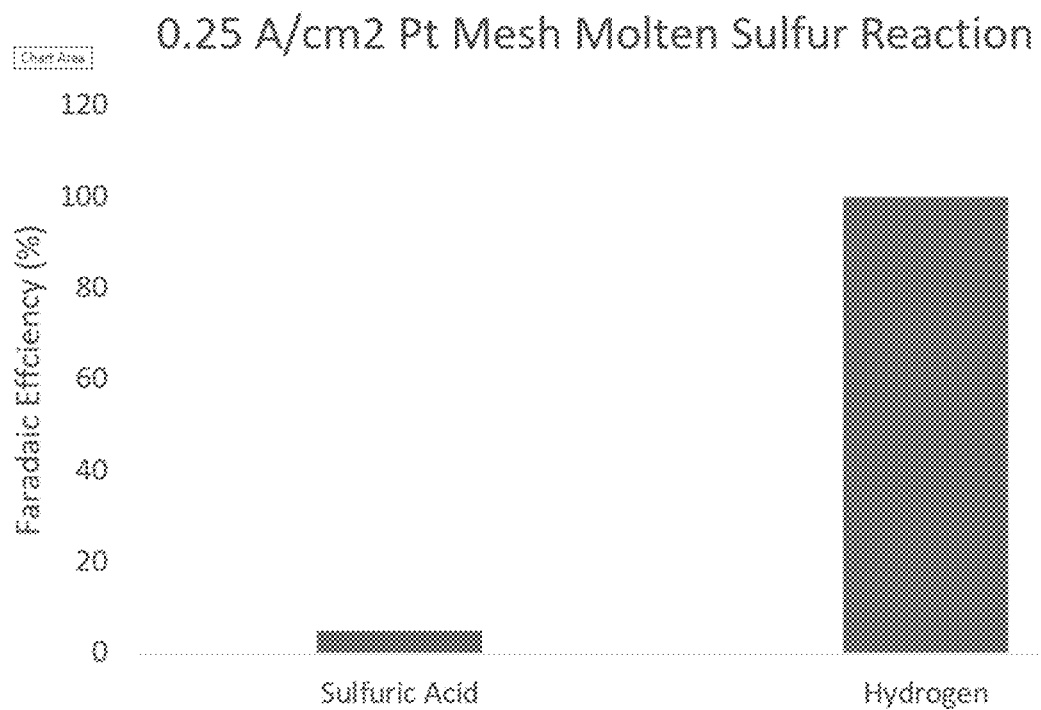
FIG. 27. Measured faradaic efficiency of sulfuric acid (via ion chromatography) and hydrogen (via volume), corresponding certain methods and systems for producing sulfuric acid and hydrogen gas, such as those including a mixture of sulfur material, supporting acid, and water.
Figure 28:
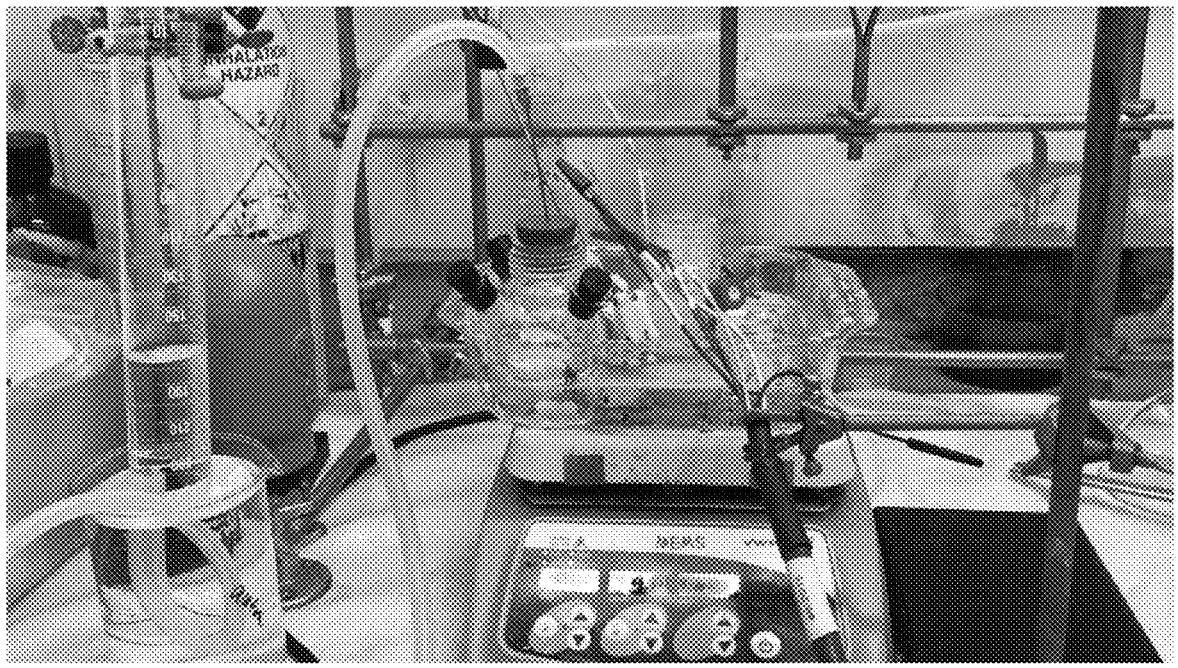
FIG. 28. Reaction setup with hydrogen capture on left, molten sulfur in anode chamber, corresponding to certain methods and systems for producing sulfuric acid and hydrogen gas, such as those including a mixture of sulfur material, supporting acid, and water.
Figure 29:
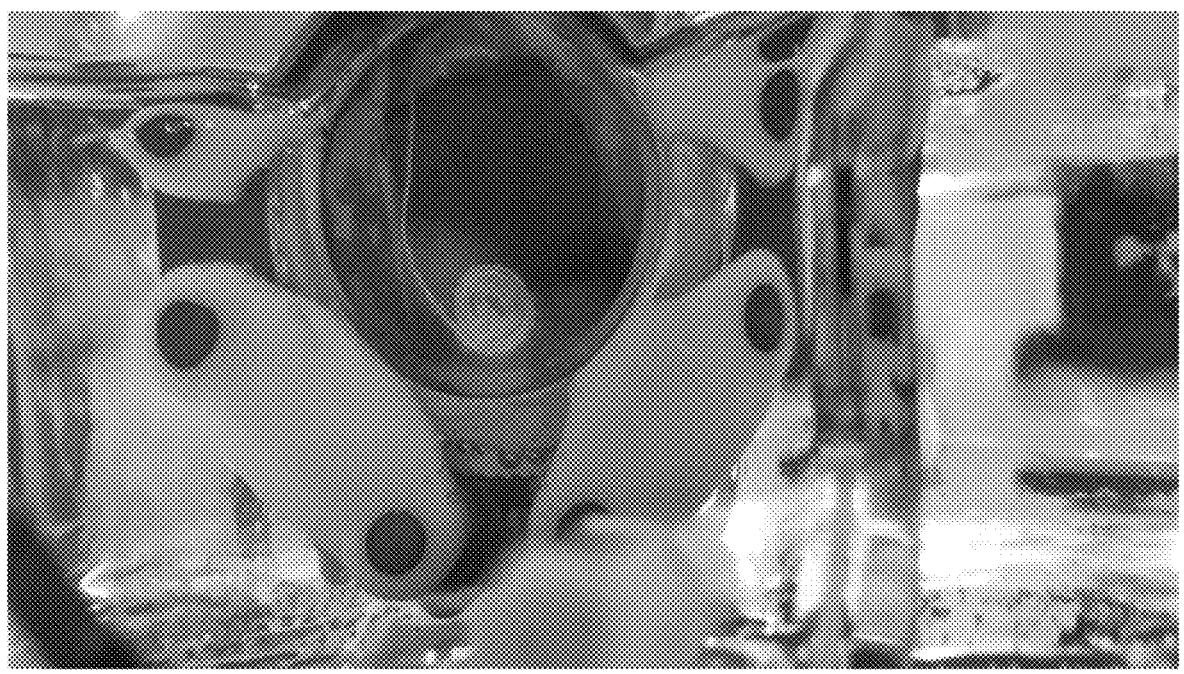
FIG. 29. Hydrogen bubbling off of the cathode during electrochemistry using a Pt cathode. These results correspond to certain methods and systems for producing sulfuric acid and hydrogen gas, such as those including a mixture of sulfur material, supporting acid, and water.

In some embodiments, the methods and systems disclosed herein are configured to provide for soil acidification, optionally via including a soil acidification unit, by using the produced sulfuric acid to acidify soil. In some embodiments, the methods and systems disclosed herein are configured to provide for agricultural water acidification, optionally via including a water acidification unit, by using the produced sulfuric acid to acidify agricultural water. For example, a reduced sulfur species (e.g. elemental sulfur) can be burned to form $SO_2$. $SO_2$ could then be mixed either in the liquid or vapor phase with water. The $SO_2$ water mixture can then be put through an electrolyser as described above to make sulfuric acid. The produced sulfuric acid can then be mixed with irrigation water in order to acidify the water. The pH could be estimated or measured iteratively to know how much sulfuric acid needs to be added to the irrigation water. The hydrogen that is cogenerated in this process at the cathode can be saved where it could be used as a fuel or can be used to generate electricity either by burning the hydrogen in a generator or passing it through a fuel cell (e.g., see FIG. 3). If this process is powered with intermittent green energy, such as a photovoltaic system, it can function as an energy storage solution. If the catalysts used in the electrolyser are also capable of oxidizing hydrogen and reducing oxygen (e.g. platinum based cathodes and anodes) then the electrolyser could be used as a fuel cell in a regenerative fuel cell scheme (e.g., see FIG. 4) where hydrogen fuel is oxidized at the anode and oxygen (from air or other sources) is reduced at the cathode to form water.

A conventional method for soil or water amendment (e.g., acidification) is via sulfur burning. In this process, sulfur is purchased by a farmer and is burned in air using a typically small scale (~75 kg sulfur/day) reactor to create sulfur dioxide which is then bubbled into irrigation water where it produces sulfurous acid. This process has two disadvantages, first it emits smog-causing sulfur dioxide into the atmosphere (>1500 tonnes/yr in California's central valley from this process alone) and second sulfurous acid is a weak acid and is about half as good at acidifying soil as sulfuric acid. Due to pKa's, only one proton is available for acidification using sulfurous acid. Conventionally, where sulfur burner infrastructure does not exist, onsite tanks of sulfuric acid are also used for soil acidification. Sulfuric acid has the advantage of being better at acidifying soils than sulfurous acid (e.g., two protons available for acidification in contrast to sulfurous acid), but conventional means for making sulfuric acid are via the thermocatalytic contact process (see reaction 2, below) which cannot be done onsite (e.g., on the farm) and shipping and handling of sulfuric acid make it at least comparably expensive to use than sulfur burning.

$2S+3O_2+2H_2O \rightarrow 2H_2SO_4 \Delta G° = -453$ kJ/mol $H_2SO_4$ (exergonic)   Reaction 2:

The methods and systems disclosed herein can make sulfuric acid using an even smaller reactor than is currently needed for sulfur burning (see reaction 3, below). Currently, sulfur burners cost around $30,000 to buy. According to certain embodiments, the systems disclosed herein, can cost around $15,000 to build and because sulfuric acid is a stronger acid than sulfurous acid, the systems disclosed herein can provide around $12,000 in savings on sulfur purchasing per machine per year. The methods and systems disclosed herein also can operate without generating smog-causing sulfur dioxide, and cogenerates clean hydrogen which could generate an additional revenue stream by providing anytime use electricity or a clean transportation fuel onsite. In California alone, the soil acidification market could be up to 3.8 million tonnes of sulfuric acid which would produce enough clean hydrogen to power Bakersfield for ¾ of the year. Farmland across the Western United States and the world need soil acidification so there is significant potential for growth using a small scale reactor model, according to certain embodiments of the methods and systems disclosed herein. All prices are in 2018 USD.

$S+O_2+2H_2O \rightarrow H_2SO_4+H_2 \Delta G° = -233$ kJ/mol $H_2$ (exergonic) 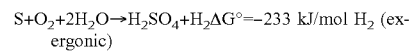  Reaction 3:

See also FIGS. 12-23 for additional embodiments, data, example, and systems.

EXAMPLE 1

Platinized Ti Catalyst

Preferably for some embodiments of the methods for producing sulfuric acid and hydrogen gas, a catalyst at the positive electrode, the negative electrode, or both, is platinized Ti. In some embodiments, platinized Ti has substantially equivalent activity to platinum metal and therefore can be a much cheaper alternative to Pt metal as a catalyst. Platinized Ti has the distinct advantage over Pt/C type catalysts of being flame resistant. In some embodiments, other platinized materials may be used as catalysts.

EXAMPLE 2

Anti Sulfur Fouling

During electrolysis of a sulfur containing compound (e.g. $SO_2$, $H_2S$, elemental sulfur, etc) elemental sulfur can plate out on the positive and/or the negative electrode which can deactivate or decrease the activity of the catalyst. In convention sulfur electrolysis systems a Pt/C catalyst is used and it is very difficult to remove the plated sulfur. Preferably for some embodiments of the methods for producing sulfuric acid and hydrogen gas, a metal based catalyst, such as Pt or platinized Ti, is used as a catalyst which allows removal of plated sulfur, such as via burning off of the sulfur, such with a flame, thereby regenerating the catalyst. Such removal of plated sulfur is difficult or impossible in the case of a Pt/C catalyst because the flame can destroy the carbon matrix.

EXAMPLE 3

Figure 30:
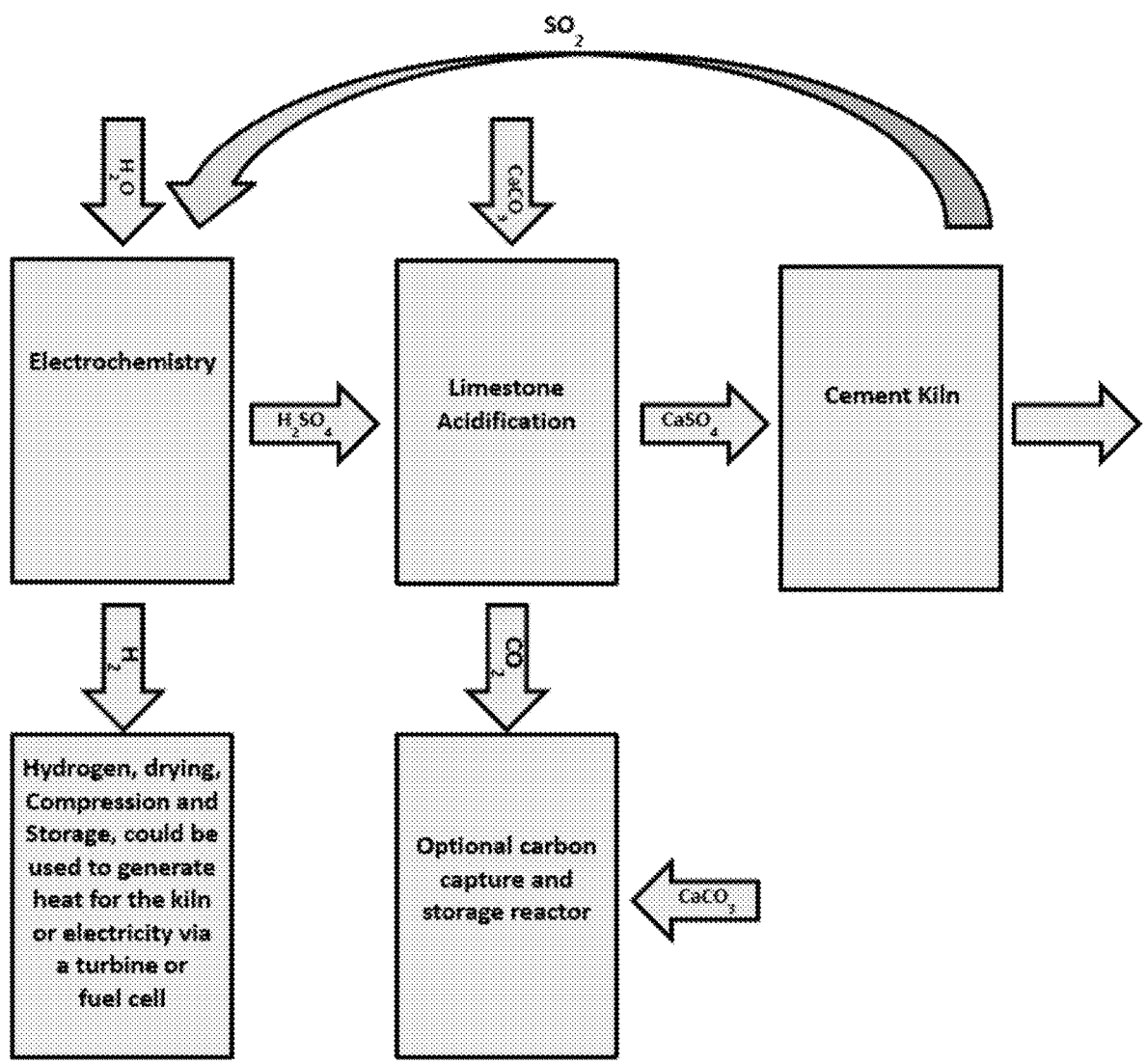
FIG. 30. A schematic corresponding to methods and systems for producing a cement material according to certain embodiments.
Figure 31:
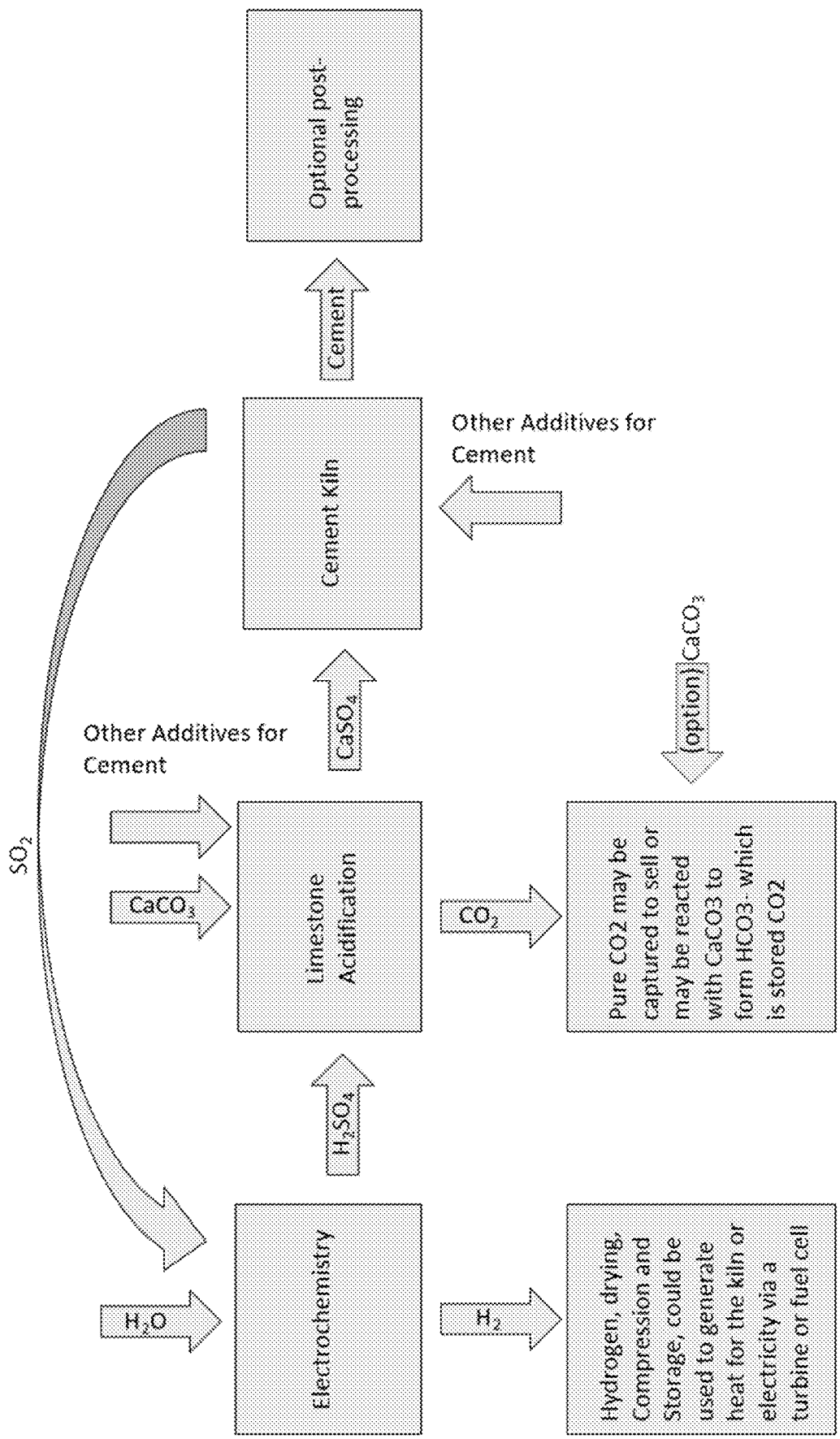
FIG. 31. A schematic corresponding to methods and systems for producing a cement material according to certain embodiments.

A Process to Co-Generate Cement or CaO and $H_2$ with Optional, Built-In Carbon Capture and Storage See also FIGS. 30 and 31 for exemplary schematics corresponding to methods and systems for producing a cement material.

Background and current state-of-the-art

In 2018 more than 4 billion tonnes of cement were produced via the thermal decomposition and sintering of limestone. In this process Limestone and certain additives such alumina-silicates, fly ash, iron oxides, and others are added to a cement kiln which heats these constituents to a sintering temperature between 1400-2000° C. In this process the $CaCO_3$ undergoes thermal decomposition to form CaO and $CO_2$ (eq 1). The process was responsible for the production of around 10% of global $CO_2$ emissions in 2017.

$$CaCO_3 + heat \rightarrow CaO + CO_2 \qquad \text{eq 1}$$

In a variation of this process called the Mueller Kuehne process (see Ribas, et al., U.S. Pat. No. 5,099,198, which is incorporated herein by reference), gypsum ($CaSO_4$) and its hydrates may be used instead of limestone because they undergo thermal decomposition below 1450° C. and may proceed according to the following equation (eq 2) which can occur at 1450° C. to make $SO_2$ and CaO (eq 2). Other additives may also be added to make CaO, $SO_2$, and other products including or separate from $O_2$.

$$CaSO_4 + heat \rightarrow CaO + SO_2 + \tfrac{1}{2}O_2 \qquad \text{eq 2}$$

This process has been the basis for several large cement plants in the UK which use the cogenerated $SO_2$ to generate sulfuric acid.

There is another proposed industrial process called the hybrid sulfur cycle or the Westinghouse process. In the hybrid sulfur cycle, sulfuric acid is electrochemically cogenerated with hydrogen from sulfur dioxide and then heat is used to thermally decompose the acid to regenerate the sulfur dioxide, this is represented by $$H_2SO_4 + heat \rightarrow SO_2 + H_2O + \tfrac{1}{2}O_2 \qquad \text{eq 3}$$

$$SO_2 + 2H_2O + electricity \rightarrow H_2 + H_2SO_4 \qquad \text{eq 4}$$

Here the net reaction is combined thermochemical and electrochemical water splitting:

$$H_2O + heat + electricity \rightarrow H_2 + \tfrac{1}{2}O_2 \qquad \text{eq 5}$$

While the electrochemistry of this reaction may proceed at lower potentials than pure electrochemical water splitting, the net input of energy is similar. Additionally, in order for this reaction to work, very concentrated sulfuric acid is necessary or typically preferred for this process to be energy efficient, and this is a challenge.

Disclosed herein are methods to electrochemically generate hydrogen and thermochemically generate cement and $SO_2$. This process follows the following reactions:

$$SO_2 + 2H_2O + electricity \rightarrow H_2SO_4 + H_2 \qquad \text{eq 6}$$

$$H_2SO_4 + CaCO_3 \rightarrow CaSO_4 + CO_2 + H_2O \qquad \text{eq 7}$$

$$CaSO_4 + heat \rightarrow CaO + SO_2 + \tfrac{1}{2}O_2 \qquad \text{eq 2}$$

The net equation is:

$$CaCO_3 + H_2O + electricity + heat \rightarrow H_2 + CaO + \tfrac{1}{2}O_2 + CO_2 \qquad \text{eq 8}$$

In a simple form of this reaction, $SO_2$ gas is dissolved in water and dilute sulfuric acid and hydrogen is made electrochemically. Limestone is added to the dilute sulfuric acid resulting in the precipitation of $CaSO_4$ and the release or capture for sale or storage of very pure $CO_2$. $CaSO_4$ is collected from the bottom of the tank.

Because the reaction of acid with $CaCO_3$ results in vigorous bubbling of $CO_2$, this vigorous bubbling may be used to pressurize produced $CO_2$ for easy transport or sale.

Advantages of the disclosed methods over the current state-of-the-art

This process has several advantages over current technology. If the source of $CaCO_3$ is limestone and the heat is generated in the cement kiln then the cement making process is similarly expensive to current industrial cement processes and the hydrogen benefits from very low electricity needs. Additionally, because $CaSO_4$ readily precipitates from solution and $CaCO_3$ will react with very dilute $H_2SO_4$ concentrations, it is not necessary to generate highly concentrated $H_2SO_4$.

This process also readily allows for carbon capture and storage by simply changing the ratio of $CaCO_3$ in the reaction:

$$SO_2 + 2H_2O + electricity \rightarrow H_2SO_4 + H_2 \qquad \text{eq 6}$$

$$H_2SO_4 + 2CaCO_3 \rightarrow CaSO_4 + Ca^{2+} + 2HCO_3^- \qquad \text{eq 9}$$

$$CaSO_4 + heat \rightarrow CaO + SO_2 + \tfrac{1}{2}O_2 \qquad \text{eq 2}$$

The net equation is:

$$2CaCO_3 + 2H_2O + electricity + heat \rightarrow H_2 + CaO + \tfrac{1}{2}O_2 + Ca^{2+} + 2HCO_3^- \qquad \text{eq 10}$$

In this version, $Ca^{2+} + 2HCO_3^-$ can be released into the ocean or any other natural water where it is stored outside of the atmosphere. This because this carbon capture only requires the input of 1 additional $CaCO_3$ and 1 additional water (both chemicals are very cheap) this process could be incredibly inexpensive.

Finally, making concentrated sulfuric acid via the hybrid sulfur cycle can be difficult, but because dilute sulfuric acid readily reacts with limestone, the applied potential could be much lower for this reaction as compared to the traditional hybrid sulfur cycle.

If this reaction were to meet the entire cement demand of the world, then it could make 180 million metric tonnes of hydrogen which would saturate the commodity market and leave the rest to be used for heat. This would have the potential of >15% reduction in global $CO_2$ emissions.

Possible variations and modifications of the disclosed methods

Other variations exclude the electrochemistry and use $SO_2$ as the acid which allow for carbon capture and storage but do not allow for hydrogen production, for example:

$$SO_2 + H_2O \rightarrow H_2SO_3 \qquad \text{eq 11}$$

$$H_2SO_3 + 2CaCo_3 \rightarrow CaSO_3 + Ca^{2+} + 2HCO_3^- \qquad \text{eq 12}$$

$$CaSO_3 + heat \rightarrow CaO + SO_2 \qquad \text{eq 13}$$

The net equation is:

$$2CaCO_3 + H_2O + heat \rightarrow CaO + Ca^{2+} + 2HCO_3^- \qquad \text{eq 14}$$

This could also be done without carbon capture and storage:

$$SO_2 + H_2O \rightarrow H_2SO_3 \quad \text{eq 15}$$

$$H_2SO_3 + CaCO_3 \rightarrow CaSO_3 + CO_2 + H_2O \quad \text{eq 16}$$

$$CaSO_3 + \text{heat} \rightarrow CaO + SO_2 \quad \text{eq 17}$$

The net equation is:

$$CaCO_3 + \text{heat} \rightarrow CaO + CO_2 \quad \text{eq 18}$$

Exemplary implementation of certain disclosed embodiments: First acid and hydrogen are cogenerated in an electrochemical reactor. Because limestone readily reacts with any acidic water, and the thermodynamics of making dilute acid are much better than strong acid, then it can be better to make dilute acid (>0.001% $H_2SO_4$) however acid of any strength would work. If dilute acid is, applied potentials for the electrolyser can be below 1 V at $1 A/cm^2$. The hydrogen can be purified as necessary and stored, sold, burned for heat or electricity, or off-gassed. The acid is mixed with the limestone or other source of $CaCO_3$ and produce $CaSO_4$ which precipitates from the reaction and is separated from the liquid fraction. The liquid fraction which can contain stored carbon can be reused or disposed of. The solid $CaSO_4$ is placed in the cement kiln where it is heated to the necessary sintering temperature, the source of heat can be burning hydrogen or some other heat source. The $SO_2$ outflow from the cement kiln can be trapped in water and used as an electrolyte to regenerate sulfuric acid and hydrogen while the produced cement or CaO could be sold, stored, or used onsite.

Silica, alumina, iron oxides, and a few other metal oxides can be sintered to the CaO in cement. , alumina, iron oxides, and a few other metal oxides can be present in the starting limestone material.

$CaSO_3$ can be thermally decomposed into CaO at a lower temp (<800 C) than $CaCO_3$ can be (>800 c) so it is a cheap way to make lime as a commodity chemical.

The reaction with $H_2SO_4$ and $CaCO_3$ can happen with or without water (either as a dry reaction or a wet reaction or a slurry reaction).

See FIGS. 30-31 for an exemplary schematic of a method and system for producing a cement material.

EXAMPLE 4

Additional Methods for Producing Sulfuric Acid and Hydrogen Gas

Figure 32:
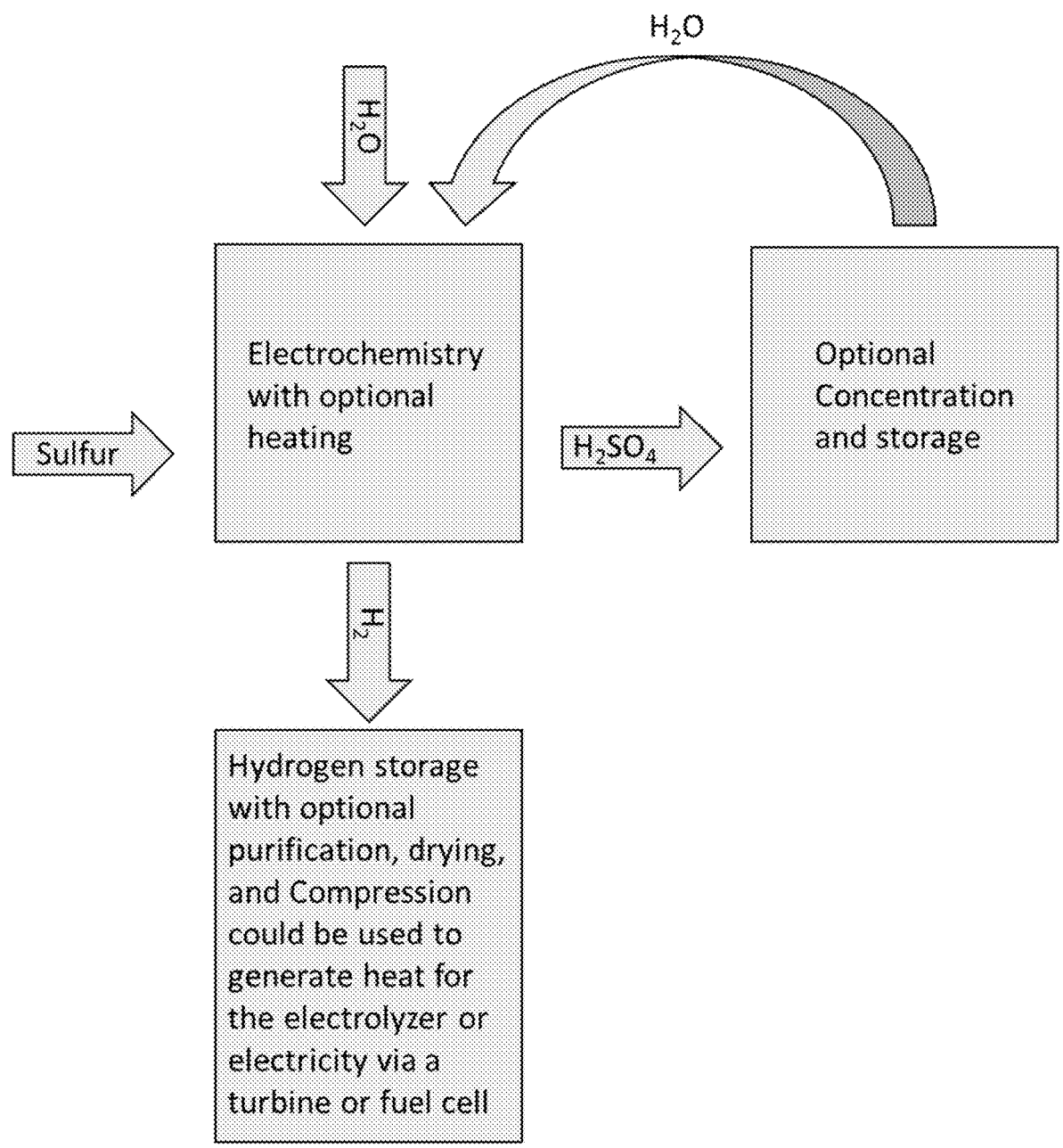
FIG. 32. A schematic corresponding to methods and systems for producing sulfuric acid and hydrogen gas according to certain embodiments.

See also FIG. 32 for a schematic corresponds to methods and systems for producing sulfuric acid and hydrogen gas according to certain embodiments, such as some embodiments described in this example.

Disclosed here are methods for performing the following chemistry for producing sulfuric acid and hydrogen gas:

$$1/X\, S_x + YO_2 + ZH_2O \rightarrow H_2SO_4 + (Z-1)H_2$$

Where X could be any integer from 1 to 8, Y could be 0, ½, 1, and Z could be 1, 2, 3, or 4. One way to write this reaction is:

$$\tfrac{1}{8}S_8 + 4H_2O \rightarrow H_2SO_4 + 3H_2$$

In certain embodiments, this reaction is performed on a Pt catalyst by melting sulfur at 130° C. and mixing the molten sulfur with a mixture of 60% $H_2SO_4$ and 40% $H_2O$ by mass which boils at an excess of 150° C. Pt is used as a catalyst and current voltage characteristics are measured, showing substantial current (>10 $mA/cm^2$) well below the thermodynamic voltage necessary for water splitting (1.23 V vs NHE). A control experiment is also performed where sulfur is not added to the reaction mixture in which case no current is observed below 1.23 V vs NHE.

Because the molar ratio of $H_2$:$H_2SO_4$ is larger than 1:1 this process could provide a source of electrochemical hydrogen and sulfuric acid for many industries that consume much more hydrogen than they do sulfuric acid (i.e. oil refining and fertilizer production).

See also FIGS. 24-29 for additional embodiments, data, methods, and systems. It is noted that Popczun, et. al. 2014 ("Highly Active Electrocatalysis of the Hydrogen Evolution Reaction by Cobalt Phosphide Nanoparticles," Angewandte Chemie, Volume 53, Issue 21, DOI 10.1002/anie.201402646, April 2014) and Popczun, et al. 2013 ("Nanostructured Nickel Phosphide as an Electrocatalyst for the Hydrogen Evolution Reaction," J. Am. Chem. Soc., June 2013, 135 (25), pp 9267-9270, DOI 10.1021/ja403440e), which are incorporated herein by reference, describe exemplary methods for measuring hydrogen gas using a pneumatic trough.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY"

(wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counter ions those that are appropriate for preparation of salts of this invention for a given application. In specific applications, the selection of a given anion or cation for preparation of a salt may result in increased or decreased solubility of that salt.

Every device, system, combination of components, or method described or exemplified herein can be used to practice the invention, unless otherwise stated.

Whenever a range is given in the specification, for example, a temperature range, a time range, or a composition or concentration range, a voltage range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. A method for producing sulfuric acid and hydrogen gas, said method comprising steps of:
   electrochemically forming the sulfuric acid and the hydrogen gas in a liquid mixture comprising a sulfur material, a supporting acid, and water;
   wherein the supporting acid is provided in the liquid mixture at an amount to raise the boiling point of the liquid mixture such that the liquid mixture does not boil under conditions in which the electrochemically forming step proceeds;
   wherein the step of electrochemically forming is characterized by the formula FX1:

$$1/X\ S_X + YO_2 + ZH_2O \rightarrow H_2SO_4 + (Z-1)H_2 \tag{FX1}$$

wherein:
   X is an integer selected from the range of 1 to 8;
   Y is 0, ½, or 1; and
   Z is 3 or 4.

2. The method of claim 1, wherein X is 8, Y is 0, and Z is 4.

3. The method of claim 1, wherein the supporting acid is sulfuric acid.

4. The method of claim 1, wherein the liquid mixture is exposed to at least one of a first catalyst and a second catalyst during the step of electrochemically forming.

5. The method of claim 1, wherein a molar ratio of the quantity of hydrogen gas produced to the quantity of sulfuric acid produced during the step of electrochemically forming is equal to 3.

6. The method of claim 1, wherein the liquid mixture has a temperature selected from the range of 118° C. to 160° C. during the step of electrochemically forming.

7. The method of claim 1, wherein the step of electrochemically forming is characterized by a current density of at least 10 mA/cm$^2$ at a voltage of less than 1.23 V vs. NHE.

8. The method of claim 1, comprising heating the liquid mixture to a temperature such that the sulfur material is molten sulfur.

9. The method of claim 1, wherein an amount of the supporting acid in the liquid mixture during the step of electrochemically forming is selected from the range of 10 mass % to 80 mass %.

10. The method of claim 4, wherein the liquid mixture is exposed to the first catalyst during the step of electrochemically forming—and wherein the first catalyst comprises Pt, Ru, Ir, tungsten carbide, Au, Ag, or any combination of these.

11. The method of claim 4, wherein the step of electrochemically forming comprises a reduction reaction to form hydrogen gas, the reduction reaction occurring in the presence of the second catalyst.

12. The method of claim 11, wherein the second catalyst comprises a hydrogen evolution catalyst or a catalyst comprising Pt, stainless steel, Cobalt phosphide, Ni, MoS, or any combination of these.

13. The method of claim 1, wherein the liquid mixture further comprises dissolved oxygen.

\* \* \* \* \*